US009713149B2

(12) United States Patent
Nguyen et al.

(10) Patent No.: US 9,713,149 B2
(45) Date of Patent: Jul. 18, 2017

(54) METHODS AND APPARATUS RELATING TO LTE FDD-TDD INTER-SYSTEM CARRIER AGGREGATION IN ADVANCED WIRELESS COMMUNICATION SYSTEMS

(71) Applicant: NEC Corporation, Tokyo (JP)

(72) Inventors: Phong Nguyen, Victoria (AU); Yuanrong Lan, Victoria (AU)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/425,546

(22) PCT Filed: Sep. 12, 2014

(86) PCT No.: PCT/JP2014/004738
§ 371 (c)(1),
(2) Date: Mar. 3, 2015

(87) PCT Pub. No.: WO2015/037250
PCT Pub. Date: Mar. 19, 2015

(65) Prior Publication Data
US 2016/0374082 A1    Dec. 22, 2016

(30) Foreign Application Priority Data

Sep. 16, 2013  (AU) ................................. 2013903561

(51) Int. Cl.
*H04W 72/04*    (2009.01)
*H04W 72/12*    (2009.01)
(Continued)

(52) U.S. Cl.
CPC ....... *H04W 72/0453* (2013.01); *H04L 1/1854* (2013.01); *H04L 5/001* (2013.01);
(Continued)

(58) Field of Classification Search
CPC ...... H04W 72/0453; H04W 72/12; H04L 5/14
See application file for complete search history.

(56) References Cited

U.S. PATENT DOCUMENTS

2010/0195615 A1    8/2010  Lee et al.
2011/0243066 A1*  10/2011  Nayeb Nazar .......... H04L 1/007
                                                                    370/328
(Continued)

FOREIGN PATENT DOCUMENTS

JP    2013-509832 A    3/2013
JP    2014-511092       5/2014
(Continued)

OTHER PUBLICATIONS

CMCC "Email Summary on FDD and TDD Joint Operation", 3GPP TSG-RAN WG1 #74, R1-133811, Barcelona, Spain, Aug. 19-23, 2013, 18 pages.
(Continued)

*Primary Examiner* — Brian D Nguyen
(74) *Attorney, Agent, or Firm* — Wilmer Cutler Pickering Hale and Dorr LLP

(57) ABSTRACT

A signalling method is disclosed for use in an advanced wireless communication network that supports FDD-TDD carrier aggregation (CA). The signalling method comprises configuring the UE (by establishing radio resource control (RRC) connection with the network through the first access node) for data transmission between the UE and the network through the first access node on the first duplex mode carrier as a primary component carrier (PCell), configuring the UE (via dedicated RRC signalling on the PCell) for data transmission between the UE and the network through the second access node on the second duplex mode carrier as a secondary component carrier (SCell), and performing schedul-
(Continued)

ing for data transmission on the aggregated SCell using either self-scheduling or cross-carrier scheduling.

19 Claims, 7 Drawing Sheets

(51) Int. Cl.
   *H04L 5/14* (2006.01)
   *H04L 1/18* (2006.01)
   *H04L 5/00* (2006.01)

(52) U.S. Cl.
   CPC .............. *H04L 5/0055* (2013.01); *H04L 5/14* (2013.01); *H04W 72/044* (2013.01); *H04W 72/12* (2013.01); *H04L 5/1469* (2013.01)

(56) References Cited

U.S. PATENT DOCUMENTS

| | | | |
|---|---|---|---|
| 2012/0182944 A1* | 7/2012 | Sorrentino | H04W 74/006 370/329 |
| 2012/0257552 A1 | 10/2012 | Chen et al. | |
| 2012/0307689 A1 | 12/2012 | Kim et al. | |
| 2012/0327821 A1* | 12/2012 | Lin | H04W 72/048 370/280 |
| 2013/0028149 A1 | 1/2013 | Chen et al. | |
| 2013/0039229 A1* | 2/2013 | Park | H04B 1/005 370/280 |
| 2013/0039231 A1 | 2/2013 | Wang | |
| 2013/0188592 A1* | 7/2013 | Yang | H04L 5/00 370/329 |
| 2013/0258864 A1* | 10/2013 | Chen | H04L 1/1854 370/241 |
| 2013/0288742 A1* | 10/2013 | Yao | H04J 11/0023 455/553.1 |
| 2013/0322260 A1* | 12/2013 | Yao | H04W 72/082 370/241 |
| 2013/0329688 A1* | 12/2013 | Yang | H04L 1/1861 370/329 |
| 2014/0003356 A1* | 1/2014 | Wang | H04W 72/1289 370/329 |
| 2014/0086078 A1* | 3/2014 | Malladi | H04W 72/042 370/252 |
| 2014/0286243 A1* | 9/2014 | Yamada | H04W 76/025 370/329 |
| 2014/0334351 A1* | 11/2014 | Yin | H04L 5/0091 370/280 |

FOREIGN PATENT DOCUMENTS

| | | |
|---|---|---|
| RU | 2421911 C2 | 6/2011 |
| WO | WO-2011/028079 A2 | 3/2011 |
| WO | WO-2011/041623 A1 | 4/2011 |
| WO | WO-2011/122835 A2 | 10/2011 |
| WO | WO-2012/003382 A2 | 1/2012 |
| WO | WO-2012/109195 A2 | 8/2012 |
| WO | WO-2012142123 A2 | 10/2012 |
| WO | WO-2013/016525 A2 | 1/2013 |

OTHER PUBLICATIONS

Decision to Grant issued in corresponding to Japanese Application No. 2015-514269, dated May 10, 2016, 5 pages.
Extended European Search Report issued in corresponding European Application No. 14837059.6, dated May 23, 2016, 9 pages.
MediaTek Inc. "Deployment Scenarios of FDD-TDD Joint Operation", 3GPP TSG RAN WG1 Meeting #74, R1-133288, Barcelona, Spain, Aug. 19-23, 2013, 7 pages.
Russian Office Action issued by the Russian Patent Office for Application No. 2015131623/07(048778) dated May 17, 2016 (18 pages).
Extended European Search Report issued by the European Patent Office for Application No. 15171961.4 dated Dec. 23, 2015 (10 pages).
LG Electronics, "CA-based aspects for FDD-TDD joint operation," 3GPP TSG RAN WG1 Meeting #74, R1-133372, Barcelona, Spain, 3 pages (Aug. 19-23, 2013).
Li, Y., et al., "Control Channel Design for Carrier Aggregation between LTE FDD and LTE TDD Systems," 2012 IEEE 75th Vehicular Technology Conference, Yokohama, Japan, pp. 1-5 (May 6-9, 2012).
Overview of 3GPP Release 8 V0.3.3 (Sep. 2014), 245 pages.
Overview of 3GPP Release 9 V0.3.4 (Sep. 2014), 125 pages.
Overview of 3GPP Release 10 V0.2.1 (Jun. 2014), 144 page.
Overview of 3GPP Release 11 V0.2.0 (Sep. 2014), 180 pages.
Samsung, "Deployment Scenarios and Network/UE Requirements for LTE TDD/FDD CA", 3GPP TSG RAN WG1 #74, Agenda Item 7.2.5.1, Barcelona, Spain, Aug. 19-23, 2013, 3 pages.
Alcatel-Lucent "Implications of Solutions for Subframe Bundling", 3GPP TSG-RAN WG1 #52, R1-080914, Sorrento, Italy, Feb. 11-15, 2008, 5 pages.
ETRI "Discussion on FDD-TDD Joint Operation Solutions", 3GPP TSG RAN WG1 Meeting #74, R1-133184, Barcelona, Spain, Aug. 19-23, 2013, 8 pages.
Japanese Notification of Reasons for Refusal issued in corresponding Japanese Patent Application No. 2015-144848, dated Jun. 7, 2016, 13 pages.

\* cited by examiner

METHODS AND APPARATUS RELATING TO LTE FDD-TDD INTER-SYSTEM CARRIER AGGREGATION IN ADVANCED WIRELESS COMMUNICATION SYSTEMS

TECHNICAL FIELD

The present application is a national stage application of International Application PCT/JP2014/004738, entitled "METHODS AND APPARATUS RELATING TO LTE FDD-TDD INTER-SYSTEM CARRIER AGGREGATION IN ADVANCED WIRELESS COMMUNICATION SYSTEMS", filed Sep. 12, 2014, which claims the benefit of priority to Australian Patent Application No. 2013903561, filed Sep. 16, 2013, the disclosures of which are incorporated herein in their entirety by reference thereto. The present invention relates to control signalling in advanced wireless communication networks and systems.

BACKGROUND ART

The following abbreviations are used herein:

TABLE 1

| | |
|---|---|
| ACK | acknowledgement |
| CA | carrier aggregation |
| CIF | carrier indicator field |
| CRS | cell-specific reference signal |
| CSS | common search space |
| DAI | downlink assignment index |
| DCI | downlink control information |
| DL | downlink |
| eIMTA | enhanced interference management and traffic adaptation |
| E-UTRA | evolved universal terrestrial radio access |
| FDD | frequency division duplex |
| H-ARQ or HARQ | hybrid automatic repeat request |
| H-ARQ ACK | hybrid automatic repeat request acknowledgment |
| HetNet | heterogeneous network |
| IE | information element |
| LTE | long term evolution |
| (E)PDCCH | (enhanced) physical downlink control channel |
| PCell | primary component carrier |
| PDSCH | physical downlink shared channel |
| (E)PHICH | (enhanced) physical H-ARQ indicator channel |
| PUCCH | physical uplink control channel |
| PUSCH | physical uplink shared channel |
| RRC | radio resource control |
| RTT | round trip time |
| Rel. | Release (e.g. LTE Rel. 11 means LTE Release 11) |
| SCell | secondary component carrier |
| TDD | time division duplex |
| UE | user equipment |
| UL | uplink |
| UL-SCH | uplink shared channel |
| USS | UE specific search space |

E-UTRA supports both FDD and TDD duplex modes. While interworking mechanisms between E-UTRA FDD and TDD have been specified, the behaviour of terminals (e.g. UEs) which are simultaneously connected to the network on two (or more) bands with different duplex modes has not been specified. For network operators with both FDD and TDD spectrum, it would appear to be important to provide efficient mechanism(s) or means for allowing both spectrum resources to be well (preferably fully) utilized in order to improve system performance and user experience.

The use of carrier aggregation (CA) offers a means for increasing peak data rates and throughput, as has been discovered during Rel. 10 LTE CA work, and it has been enhanced during Rel. 11 LTE CA enhancement work.

Efficient TDD and FDD spectrum usage and utilization of different technologies jointly are becoming more and more important for future LTE deployments in order to accommodate increased throughput and capacity needs. There may therefore be an increased need to support joint LTE FDD-TDD operations such that both spectrum resources can be well or fully utilized to improve system performance. It is expected that, in future LTE FDD-TDD CA deployment scenarios, either a TDD or a FDD cell may be used as the primary component carrier (PCell), and therefore support for generic LTE FDD-TDD CA would appear to be needed.

As an important technology in CA systems, cross-carrier scheduling enables the PDSCH and PUSCH resource on one carrier component to be scheduled by PDCCH on another carrier component. For instance, PDCCH can be transmitted on one serving cell (e.g. a serving cell with better link quality) and the related PDSCH or PUSCH may be transmitted on another serving cell. This may be realized by adding a 3-bit carrier indicator field (CIF) in downlink control information (DCI) format. In the FDD-only or TDD-only CA systems in Rel. 10 and Rel. 11, the number of blind decodings remains the same regardless of whether or not cross-carrier scheduling is configured. In LTE FDD-TDD CA system with cross-carrier scheduling, however, the number of blind decoding trials could be larger if the DCI format is configured by following the legacy system specification.

As specified in Rel. 8-11, the content of the same DCI format can be different for FDD and TDD systems. To be specific, there are additional bit fields in DCI format to support TDD operation. For instance:

In DCI format 0/4 for TDD operation, a 2-bit field is used for UL index or DL assignment index (DAI), but this 2-bit field does not exist in DCI format 0/4 for FDD systems;

In DCI format 1/1A/1B/1D/2/2A/2B/2C for TDD operation, a 2-bit field is used for DL assignment index, but this 2-bit field does not exist in DCI format 1/1A/1B/1D/2/2A/2B/2C for FDD systems;

In DCI format 1/1A/1B/1D/2/2A/2B/2C for TDD operation, a 4-bit field is used for HARQ process number, but there is a 3-bit field in DCI format 1/1A/1B/1D/2/2A/2B/2C for FDD systems.

SUMMARY OF INVENTION

Technical Problem

For one UE configured with cross-carrier scheduling in a LTE FDD-TDD CA system, PDCCHs of two duplex modes (FDD and TDD) can be transmitted on the same serving cell. For instance, the PDCCH corresponding to PDSCH or PUSCH transmission on the TDD serving cell could be transmitted on the FDD serving cell. Although the bandwidth of the two serving cells can be the same, the DCI format may still have different sizes because of the above-mentioned additional bits for TDD operation. As a result, the number of blind decoding trials may increase dramatically because of the increased number of different DCI sizes. There would appear to be a need to address this issue.

Moreover, since PUCCH which carries HARQ feedback is located on the primary component carrier only, and since HARQ timing/UL grant timing is different for FDD and TDD systems, there would appear to be a need to handle the related timing issue in LTE FDD-TDD CA systems.

Additionally, in order to accommodate fluctuations in DL/UL traffic ratio in a TDD serving cell, flexible-TDD may be implemented for TDD serving cells. Two other issues which arise when a flexible-TDD serving cell is configured as SCell, namely fast TDD configuration indication and HARQ-ACK/UL grant timing, may also need to be addressed for LTE FDD-TDD CA systems.

It is to be clearly understood that mere reference herein to previous or existing apparatus, systems, methods, procedures, practices, publications or other information, or to any problems or issues, does not constitute an acknowledgement or admission that any of those things individually or in any combination formed part of the common general knowledge of those skilled in the field, or that they are admissible prior art.

Solution to Problem

In one possible form, the invention relates broadly to a signalling method for use in an advanced wireless communication network that supports frequency division duplex—time division duplex (FDD-TDD) carrier aggregation (CA), the system including:

a user equipment (UE) which supports FDD-TDD CA;
a first access node operable to communicate with the UE on a first duplex mode carrier, where the first duplex mode is one of FDD or TDD; and
a second access node operable to communicate with the UE on a second duplex mode carrier, where the second duplex mode is the other of FDD or TDD opposite to the first duplex mode;

the method comprising:
configuring the UE, by establishing radio resource control (RRC) connection with the network, for data transmission between the UE and the network through the first access node on the first duplex mode carrier as a primary component carrier (PCell),
configuring the UE, via dedicated RRC signalling on the PCell, for data transmission between the UE and the network through the second access node on the second duplex mode carrier as a secondary component carrier (SCell), and
performing scheduling for data transmission on the aggregated SCell using either self-scheduling or cross-carrier scheduling.

In some embodiments or deployment scenarios, the first duplex mode may be FDD and the second duplex mode may be TDD. Hence, the PCell (and first access node) may be FDD and the SCell (and second access node) may be TDD.

Furthermore, in some particular embodiments or deployment scenarios, cross-carrier scheduling may be used for scheduling data transmission on the aggregated SCell. In these embodiments, the first access node may schedule downlink data transmission on both the FDD PCell and the TDD SCell via network backhaul. The UE may follow a FDD timing and feedback rule for feeding back, to the first access node, HARQ-ACKs in response to data received on the FDD PCell downlink carrier and the TDD SCell downlink carrier. The first access node may use a FDD DCI format to inform the UE of downlink data transmissions on the FDD PCell downlink carrier and the TDD SCell downlink carrier. The said DCI format may include, for example, a 3-bit HARQ number field and no downlink assignment index (DAI) field. The first access node may schedule uplink data transmission from the UE on both the FDD PCell and the TDD SCell and transmit uplink grants for FDD PCell transmission and TDD SCell transmission using a FDD uplink scheduling timing rule. In processing the DCI, the UE may assumes that a DCI of the same size received on FDD PCell provides downlink scheduling and uplink scheduling for both the PCell and SCell. Upon reception of downlink scheduling for SCell, the UE may apply the FDD timing rule for feeding back HARQ-ACKs to the FDD PCell. Also, upon reception of uplink grant for uplink data transmission on the TDD SCell uplink carrier, the UE may apply the FDD timing rule for transmitting physical uplink shared channel (PUSCH) to the TDD SCell.

In other particular embodiments or deployment scenarios (where the first duplex mode is FDD and the second duplex mode is TDD), self-scheduling may be used for scheduling data transmission on the aggregated SCell. In these embodiments, the first access node may schedule downlink data transmission only on the FDD PCell and the second access node may schedule downlink data transmission only on the TDD SCell. The UE may follow a FDD timing and feedback rule for feeding back to the first access node HARQ-ACKs in response to data received on the FDD PCell downlink carrier, and may follow a TDD timing and feedback rule for feeding back to the second access node HARQ-ACKs in response to data received on the TDD SCell downlink carrier. Upon reception of HARQ-ACK of SCell on PUCCH, the first access node may forward the received SCell HARQ-ACK to the second access node via backhaul. The first access node may use FDD DCI format(s) to inform the UE of downlink data transmission on the FDD PCell downlink carrier, and the second access node may use TDD DCI format(s) to inform the UE of downlink data transmission on the TDD SCell downlink carrier. The first access node may schedule uplink data transmissions from the UE on the FDD PCell and transmit uplink grants for FDD PCell transmission using a FDD uplink scheduling timing rule. The second access node may schedules uplink data transmission from the UE on the TDD SCell and transmit uplink grants for TDD SCell transmission using a TDD uplink scheduling timing rule.

In other embodiments or deployment scenarios different to any of those described above, the first duplex mode may instead be TDD and the second duplex mode may instead be FDD. Hence, the PCell (and first access node) may be TDD and the SCell (and second access node) may be FDD.

In some particular embodiments or deployment scenarios (where the first duplex mode is TDD and the second duplex mode is FDD), cross-carrier scheduling may be used for scheduling the SCell. Cross-subframe-cross-carrier scheduling or multiple-subframe-cross-carrier scheduling may be adopted. In these embodiments, the first access node may schedule downlink data transmission on both the TDD PCell and the FDD SCell via network backhaul. The UE may follow a TDD timing and feedback rule for feeding back, to the first access node, HARQ-ACKs in response to data received on the TDD PCell downlink carrier and on the FDD SCell downlink carrier. The first access node may use a TDD DCI format to inform the UE of downlink data transmissions on the TDD PCell downlink carrier and on the FDD SCell downlink carrier. The DCI format may include, for example, a 4-bit HARQ number field and a 2-bit DAI field. The first access node may schedule uplink data transmission from the UE on both the TDD PCell and the FDD SCell and transmit uplink grants for TDD PCell transmission and FDD SCell transmission using a TDD uplink scheduling timing rule. In processing the DCI, the UE may assume that a TDD DCI of the same size as received on TDD PCell provides downlink scheduling and uplink scheduling for both the PCell and SCell. Upon reception of downlink scheduling and downlink data for SCell, the UE may apply the TDD timing rule for feeding back HARQ-ACKs to the TDD PCell. Also, upon reception of uplink grant for uplink data transmission on the FDD SCell uplink carrier, the UE may apply the TDD timing rule for transmitting PUSCH to the FDD SCell.

In other particular embodiments or deployment scenarios (where the first duplex mode is TDD and the second duplex mode is FDD), self-scheduling is used for scheduling the SCell. In these embodiments, the first access node may schedule downlink data transmission only on the TDD PCell and the second access node may schedule downlink data transmission only on the FDD SCell. The UE may follow the TDD timing and feedback rule for feeding back to the first access node HARQ-ACKs in response to data received on the TDD PCell downlink carrier, and may follow the PCell's TDD timing and feedback rule for feeding back to the second access node HARQ-ACKs in response to data received on the FDD SCell downlink carrier. The UE may feedback HARQ-ACK of data scheduled on downlink subframe(s) on the FDD SCell with corresponding uplink subframe(s) on the TDD PCell, together with incoming downlink transmissions on downlink subframes which correspond to downlink subframes on the TDD PCell. Upon reception of HARQ-ACK of the SCell on PUCCH, the first access node may forward the received SCell HARQ-ACKs to the FDD SCell via backhaul. The first access node may use a TDD DCI format to inform the UE of downlink data transmission on TDD PCell downlink carrier, and the second access node may use a TDD DCI format(s) to inform the UE of downlink data transmission on FDD SCell downlink carrier. The first access node may schedule uplink data transmission from the UE on the TDD PCell and transmit uplink grants for TDD PCell transmission using the TDD uplink scheduling timing rule. The second access node may schedule uplink data transmission from the UE on FDD SCell and transmit uplink grants for FDD SCell transmission using FDD uplink scheduling timing rule and FDD HARQ-ACK rule. In processing DCI received on FDD SCell downlink carrier, the UE may assume that a received TDD DCI provides downlink scheduling and uplink scheduling for SCell. Upon reception of downlink scheduling and transmitted data for SCell, the UE may apply a TDD timing rule for feeding back HARQ-ACKs to the FDD SCell. Also, upon reception of downlink scheduling and transmitted data for FDD SCell subframe(s) with corresponding uplink subframe(s) on TDD PCell, the UE may feedback HARQ-ACK for data scheduled on those downlink subframes, together with incoming downlink transmissions on downlink subframes which correspond to downlink subframes on TDD PCell. Upon reception of uplink grant for uplink data transmission on the FDD SCell uplink carrier, the may UE apply the FDD timing rule for transmitting PUSCH to the FDD SCell.

In some yet further embodiments, a flexible-TDD carrier may be the SCell, and by observing instantaneous traffic in the second access node within a predetermined observation time, the network may configure the second access node to change the TDD uplink-downlink configuration on the TDD SCell. Implicit fast signalling may be used. Upon deciding that a flexible subframe on the SCell is to operate as a downlink subframe, the first access node may send downlink scheduling information on a PCell downlink subframe corresponding to a SCell flexible subframe on which downlink data is transmitted from the second access node. Upon deciding a flexible subframe on the SCell is to operate as an uplink subframe, the first access node may send an uplink grant on a PCell downlink subframe corresponding to a SCell flexible subframe on which the UE is supposed to transmit uplink data on TDD SCell. The SCell TDD uplink-downlink configuration may be changed by the second access node on a radio frame basis, and the UE may monitor search space on PCell for downlink transmission scheduling and uplink grant on SCell. On a PCell downlink subframe corresponding to a SCell flexible subframe, if the UE detects downlink transmission scheduling for SCell, it may perform processing of PDSCH/DL-SCH on the said SCell flexible subframe. On a PCell downlink subframe, if the UE detects an uplink grant for SCell, it may process and transmit PUSCH/UL-SCH on the SCell flexible incoming subframe corresponding to the PCell downlink subframe on which an uplink grant was received.

The following is a further discussion of the invention (or aspects or embodiments thereof). In some areas, the discussion below may use slightly different wording/nomenclature to that used above.

Methods, procedures and apparatus, which may be implemented in apparatus used in heterogeneous networks, for assisting FDD-TDD inter-system carrier aggregation are proposed herein which may help to achieve higher end-user data rates, and/or improve support of additional HetNet deployment. An apparatus, which may be a base station, may communicate with a first UE through at least one component carrier (PCell) of a first system. In addition, the said apparatus may determine whether to aggregate the at least one component carrier (PCell) of the first system with at least one additional component carrier (SCell) of a second system for communication with the first UE which is capable of performing inter-systems carrier aggregation. The at least one additional component carrier of the second system may be used by the second base station as PCell to communicate with a second UE(s) within the second base station coverage. The first base station and the second base station may be deployed in or as heterogeneous networks. The first system may be LTE FDD or LTE TDD, and the second system may by LTE TDD/flexible TDD or LTE FDD.

In one configuration, the at least one component carrier may include an FDD uplink carrier and an FDD downlink carrier serviced by the first base station, and the at least one additional component carrier may include at least one TDD carrier serviced by the second base station. In this configuration a UE may initially detect the first base station and through the at least one component carrier (PCell) of the FDD system establish RRC connection with the advanced mobile network. While in RRC-Connected mode, the said UE may be configured to add the at least one additional component carrier as an aggregated TDD carrier component (SCell) for communication in downlink, or communication in uplink, or communication in both downlink and uplink.

If cross-carrier scheduling is enabled, the first base station may use a transparent DCI format of the same size as FDD DCI (e.g. DCI with a 3-bit HARQ process number and no DAI field) to schedule DL data transmission on both the PCell and SCell, and the first UE may be expected to understand and to follow a FDD timing and feedback rule for sending HARQ-ACKs in response to data received on the FDD PCell DL carrier and DL subframe(s) of TDD SCell carrier(s). Furthermore, if cross-carrier scheduling is enabled, the first base station may schedule UL data transmission from the UE on both FDD PCell and TDD SCell and transmit UL grants for scheduling FDD PCell transmission and TDD SCell transmission by applying a FDD UL scheduling timing rule. In one configuration, the SCell may be a flexible-TDD carrier and the second base station may be configured to change the TDD UL-DL configuration as often as on a radio frame basis. Preferably, an implicit signalling approach may be used for this, in which case, upon deciding that a flexible subframe on the SCell is a DL subframe, the first base station may send DL scheduling information on a PCell DL subframe corresponding to a SCell flexible subframe on which DL data is transmitted from the second base station. Furthermore, upon deciding that a flexible subframe on the SCell is an UL subframe, the first base station may send UL grant on a PCell DL subframe corresponding to a SCell flexible subframe on which the first UE is expected to transmit UL data on UL subframe of TDD SCell carrier. If cross-carrier scheduling is enabled and the first UE is configured to perform FDD-TDD inter system CA with a FDD PCell and TDD SCell(s), the first UE may assume that a DCI of the same size (e.g. 3-bits HARQ process number field and no DAI bit field for scheduling DL transmission DCI) received on the FDD PCell provides DL scheduling and UL scheduling for both the PCell and SCell(s). Upon reception of DL scheduling for the SCell, the first UE may apply a FDD timing rule for sending HARQ-ACKs. Upon reception of UL grant for UL data transmission on the TDD SCell UL carrier, the first UE may apply the FDD timing rule for selecting UL subframe to transmit PUSCH/UL-SCH on the TDD SCell carrier. Since the SCell TDD UL-DL configuration may be changed on a radio frame basis, the first UE may monitor search space on the PCell for DL transmission scheduling and UL grant on the SCell. On a PCell DL subframe corresponding to a SCell flexible subframe, if the first UE detects a DL transmission scheduling for the SCell, it may perform the processing of PDSCH/DL-SCH on the said SCell flexible subframe. Similarly, on a PCell DL subframe, if the first UE detects an UL grant for the SCell, it may process and transmit PUSCH/UL-SCH on the SCell incoming flexible subframe corresponding to the PCell DL subframe on which an UL grant is received.

If cross-carrier scheduling is disabled, the first base station may use a FDD DCI format (i.e. DCI with 3-bits HARQ number field and no DAI field) to schedule DL data transmission only on a FDD PCell DL carrier and the second base station may use a TDD DCI format (i.e. DCI with 4-bits HARQ number field and 2-bits DAI field) to schedule DL data transmission only on DL subframe(s) of the TDD SCell carrier. The first UE may follow a FDD timing and feedback rule for feeding back HARQ-ACKs in response to data received on FDD PCell DL carrier, but may follow a TDD timing and feedback rule for feeding back HARQ-ACKs in response to data received on DL subframe of TDD SCell carrier(s). Furthermore, the first base station may transmit UL grant to schedule UL data transmission from the first UE on FDD PCell UL carrier using FDD UL scheduling timing rule. The second base station may transmit UL grants to schedule UL data transmission from UE on UL subframe of TDD SCell carrier using TDD UL scheduling timing rule. In one configuration, the SCell carrier may be a flexible-TDD carrier and the second base station may be configured to change the TDD UL-DL configuration as frequently as on a radio frame basis. The first base station may apply explicit fast signalling in the form of DCI sent on PCell common search space to inform the first UE of the change of UL-DL configuration on its TDD SCell. If cross-carrier scheduling is disabled and the first UE is configured to perform FDD-TDD inter system CA with a FDD PCell and a TDD SCell(s), the first UE may assume that a TDD DCI (i.e. 4-bits HARQ process number field and 2-bits DAI field) received provides DL scheduling and UL scheduling for SCell(s). Upon reception of DL scheduling for the SCell, the first UE may apply a TDD timing rule for sending HARQ-ACKs on PUSCH. Upon the reception of UL grant for UL data transmission on the TDD SCell UL carrier, the first UE may apply a TDD timing rule for transmitting PUSCH on TDD SCell carrier. In one configuration where the SCell is flexible-TDD, the first UE may monitor PCell common search space for explicit fast signalling indicating the TDD UL-DL configuration change on its flexible-TDD SCell.

In another configuration, the at least one component carrier may include at least one TDD carrier serviced by the first base station, and one additional component carrier may include an FDD uplink carrier and an FDD downlink carrier serviced by the second base station. In this configuration, a UE may initially detect the first base station and through the at least one component carrier (PCell) of the TDD system establish RRC connection with the advanced mobile network. While in RRC-Connected mode, the said UE may be configured to add one additional component carrier as an aggregated FDD carrier component (SCell) for communication in downlink, or communication in uplink, or communication in both downlink and uplink.

If cross-carrier scheduling is enabled, the first base station may use a transparent DCI format of the same size as TDD DCI (i.e. DCI with 4-bits HARQ process number and 2-bits DAI field) to schedule DL data transmission on both DL subframe of PCell carrier and SCell DL carrier and the first UE may understand and follow a TDD timing and feedback rule for sending HARQ-ACKs in response to data received on DL subframe(s) of TDD PCell carrier and FDD SCell DL carrier. Furthermore, if cross-carrier scheduling is enabled, the first base station may schedule UL data transmission from the first UE on both UL subframes of the TDD PCell carrier and FDD SCell UL carrier and transmit UL grants for TDD PCell transmission and FDD SCell transmission by applying a TDD UL scheduling timing rule. If cross-carrier scheduling is enabled and the first UE is configured to perform FDD-TDD inter system CA with a TDD PCell and a FDD SCell, the first UE may assume that a DCI of the same size (i.e. 4-bits HARQ process number field and 2-bits DAI bit field for scheduling DL transmission DCI) received on a TDD PCell DL subframe provides DL scheduling and UL scheduling for both the TDD PCell and the FDD SCell. Upon reception of DL scheduling and DL data for the SCell, the first UE may apply a TDD timing rule for sending HARQ-ACKs in UL. Upon reception of UL grant for UL data transmission on a FDD SCell UL component carrier, the first UE may apply a TDD timing rule for selecting UL subframe to transmit PUSCH/UL-SCH on FDD SCell UL carrier.

If cross-carrier scheduling is disabled, the first base station may use a TDD DCI format (i.e. DCI with 4-bits HARQ number field and 2-bits DAI field) to schedule DL data transmission only on DL subframe of the TDD PCell carrier and the second base station may also use a TDD DCI format to schedule DL data transmission only on FDD SCell DL carrier. The UE may follow a TDD timing and feedback rule for feeding back HARQ-ACKs in response to data received on DL subframe of TDD PCell carrier, and may also follow a TDD timing and feedback rule for feeding back HARQ-ACKs in response to data received on FDD SCell DL carrier. Additionally, the UE may feedback HARQ-ACK of data scheduled on DL subframe(s) on the FDD SCell with corresponding UL subframe(s) on the TDD PCell, together with the incoming DL transmission on DL subframe which corresponds to DL subframe on the TDD PCell. Furthermore, the first base station may transmit UL grant to schedule UL data transmission from the first UE on the TDD PCell using a TDD UL scheduling timing rule. The second base station may transmit UL grants to schedule UL data transmission from the first UE on the FDD SCell carrier using a FDD UL scheduling timing rule and FDD HARQ- ACK rule. If cross-carrier scheduling is disabled and the first UE is configured to perform FDD-TDD inter system CA with a TDD PCell and a FDD SCell, the first UE may assume that a received TDD DCI (i.e. 4-bits HARQ process number field and 2-bits DAI field for scheduling DL transmission DCI) provides DL scheduling and UL scheduling for the SCell. Upon reception of DL scheduling and transmitted data for the SCell, the first UE may apply TDD timing rule for sending HARQ-ACKs. Additionally, upon reception of DL scheduling and transmitted data for FDD SCell DL subframe(s) with corresponding UL subframe(s) on TDD PCell, the first UE may feedback HARQ-ACK of data scheduled on those DL subframe(s), together with the incoming DL transmission on DL subframe which corresponds to DL subframe on TDD PCell. Upon reception of UL grant for UL data transmission on FDD SCell UL carrier, the first UE may apply FDD timing rule for transmitting PUSCH on FDD SCell UL carrier.

Any of the features described herein may be combined in any combination with any one or more of the other features described herein within the scope of the invention.

BRIEF DESCRIPTION OF DRAWINGS

Preferred features, embodiments and variations of the invention may be discerned from the following Detailed Description which provides sufficient information for those skilled in the art to perform the invention. The Detailed Description is not necessarily to be regarded as limiting the scope of the preceding Summary of the Invention, or the scope of the invention, in any way. The Detailed Description will make reference to a number of drawings as follows.

DESCRIPTION OF EMBODIMENTS

Figure 1:
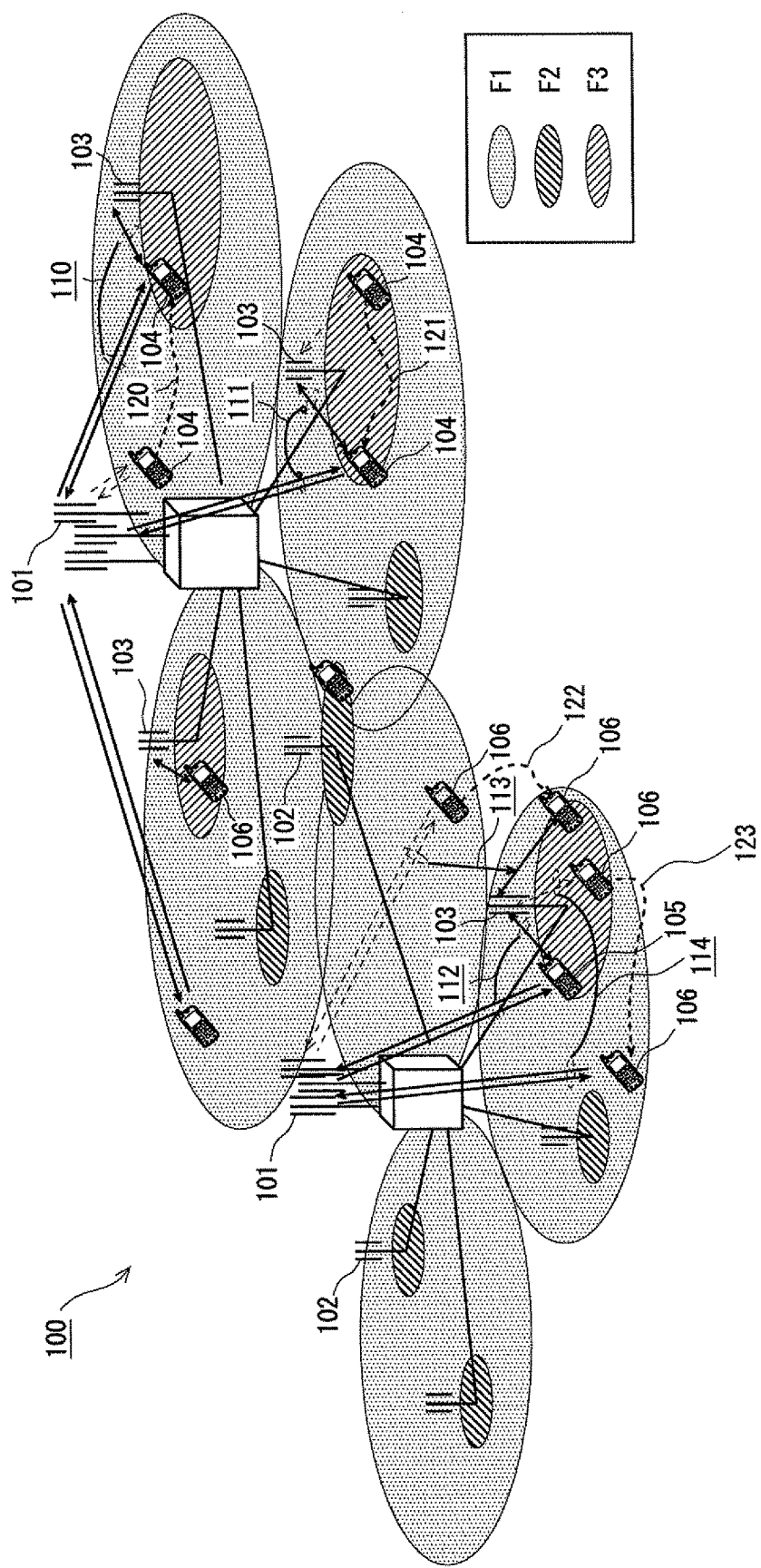
FIG. 1 illustrates an advanced wireless communication system and is referred to below for the purposes of explaining certain different inter-system FDD-TDD carrier aggregation (CA) deployment scenarios.

FIG. 1 depicts an advanced wireless communication system 100 in which a number of different inter-system FDD and TDD carrier aggregation deployment scenarios are represented. The advanced wireless communication system 100 is a heterogeneous network (HetNet) and it includes:
a plurality of macro access nodes 101 each representing a macro base station (e.g. an eNB) that can be configured to transmit and receive FDD signals on separate DL and UL carrier frequencies respectively;
a plurality of small cell access nodes 102 each representing a pico-base station that can be configured to transmit and receive FDD signals on separate DL and UL carrier frequencies respectively;
a plurality of small cell access nodes 103 each representing a pico-base station that can be configured to transmit and receive DL and UL TDD signals on a single carrier frequency; and
a plurality of advanced user equipments (UEs) 104, 105 and 106 that are capable of performing FDD signal transmission and reception, TDD signal transmission and reception, and FDD-TDD signal transmission and reception by way of FDD-TDD carrier aggregation.

Each macro base station 101 serves one or more macro-cells over a first paired carrier frequency F1. Each pico-base station 102 serves a small-cell over a second paired carrier frequency F2. Each pico-base station 103 serves a small-cell over a third unpaired carrier frequency F3. The first carrier frequency F1 and the second carrier frequency F2 could be same or different. The UL carrier frequency of the first carrier frequency F1 and the third carrier frequency F3 may be the same.

Each macro cell base station 101 interconnects with small cell pico-base station(s) 102 and/or 103 via (preferably ideal) advanced network backhaul. According to embodiments of the present invention, inter-system FDD-TDD CA may be deployed as follows:

1. FDD-TDD carrier aggregation (CA) where a FDD carrier is the PCell and TDD carrier(s) is/are the SCell(s).

This first deployment scenario is indicated as 110 in FIG. 1. In this deployment scenario, a UE 104 can initially detect and camp on a FDD macro-cell provided by a base station 101. The said UE 104 initially establishes RRC connection with the advanced network through the said macro-base station 101 on FDD carriers. Due to mobility 120 (i.e. movement of the UE), the UE 104 may enter small cell coverage serviced by a TDD base station 103. Via dedicated RRC signalling through the macro-base station 101, the said UE 104 is then configured to perform TDD small cell measurement and to add a second TDD carrier component serviced by the pico-base station 103 as an aggregated carrier for additional data reception and transmission (i.e. in addition to data transmission on the primary FDD carrier component which functions as an anchor component carrier and which is serviced by the macro-base station 101). The primary carrier component (PCell) serviced by macro base-station 110 in this scenario is LTE FDD while the secondary carrier component (SCell) serviced by pico-base station 103 is LTE TDD. There could be multiple (e.g. possibly up to five) SCells in this first deployment scenario 110.

2. FDD-TDD carrier aggregation (CA) where a TDD carrier is the PCell and a FDD carrier is the SCell).

This second deployment scenario is indicated as 111 in FIG. 1. In this deployment scenario, a UE 104 can initially detect and camp on a TDD pico-cell provided by a base station 103. The said UE 104 initially establishes RRC connection with the advanced mobile network through TDD pico-base station 103 on the TDD carrier. Due to UE mobility 121 (i.e. movement of the UE), the UE 104 might enter the small cell edge (i.e. it may become located near the edge of the small cell). In any case, simultaneous transmission and/or reception of data via the overlaid FDD macro-cell 101 and the TDD pico-cell 103 may be possible. Through dedicated RRC signalling via the TDD pico-base station 103, the said UE 104 can therefore then be configured to perform FDD macro cell measurement and to add a second FDD carrier component serviced by the overlaid FDD macro base station 101 as an aggregated carrier for additional data reception and transmission (i.e. in addition to data transmission on the primary TDD carrier component that is serviced by the TDD pico-base station 103). The primary carrier component (PCell) serviced by pico-base station 103 in this scenario is LTE TDD and the secondary carrier component (SCell) serviced by macro base-station 101 is LTE FDD. There may be up to one SCell (i.e. there is a maximum of one SCell) in this second deployment scenario 111.

3. FDD-TDD carrier aggregation (CA) where a FDD carrier is the PCell and a flexible-TDD carrier is the SCell).

This third deployment scenario is indicated as 112 in FIG. 1. In this deployment scenario, a UE 105 can detect and camp on a FDD macro-cell provided by a base station 101. The said UE 105 initially establishes RRC connection with the advanced mobile network through the FDD macro-base station 101 on the FDD carrier. Via dedicated RRC signalling through the FDD macro-base station 101, the said UE 105 is then configured to perform small cell measurement and to add a second TDD carrier component serviced by TDD pico-base station 103 as an aggregated carrier for additional data reception and transmission (i.e. in addition to data transmission on the primary FDD carrier component which functions as an anchor component carrier and is serviced by the macro-base station 101). The primary carrier component (PCell) serviced by the macro base-station 101 is LTE FDD while the secondary carrier component (SCell) serviced by pico-base station 103 is flexible LTE TDD.

The traffic within the said flexible LTE TDD pico-cell 103 may change due to one or more new UE(s) entering the pico-cell coverage and/or one or more existing UE(s) departing from the pico-cell coverage. See, for example in FIG. 1, handover of UE 106 from macro cell 101 to TDD pico-cell 103 due to UE mobility (as indicated by 122 in FIG. 1) and also handover of another UE 106 from TDD pico-cell 103 to FDD macro-cell 101 due to mobility (as indicated by 123 in FIG. 1). As the cell traffic changes, the pico-cell 103 may flexibly change the TDD UL-DL configuration of the pico-cell to optimise user experienced throughput for each active UE in its coverage.

Figure 2A:
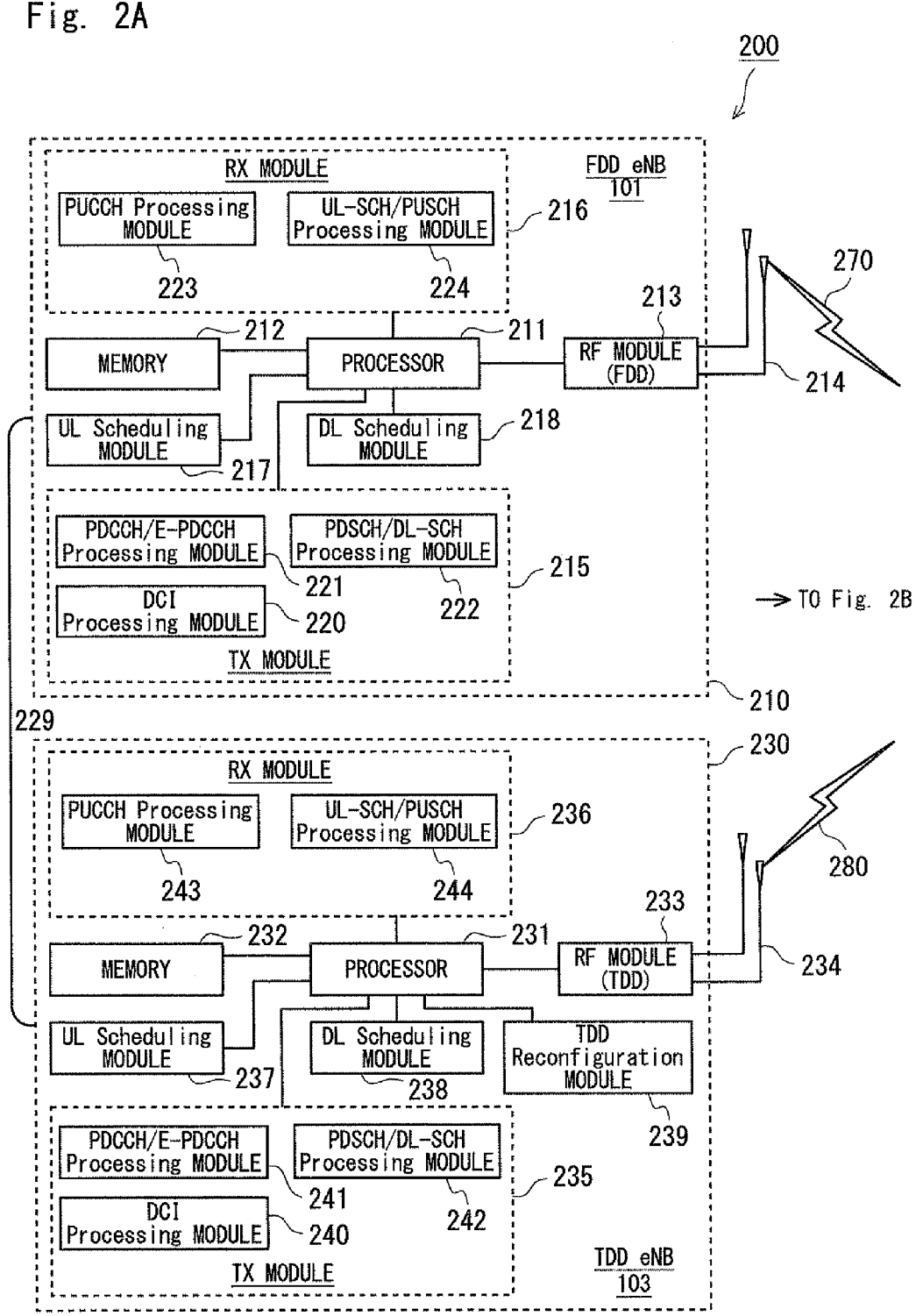
FIG. 2A contains simplified block diagrams of typical advanced base stations (eNBs), specifically a FDD access node and a TDD access node, and also a simplified block diagram of an advanced UE which is able to perform inter-system FDD-TDD CA.
Figure 2B:
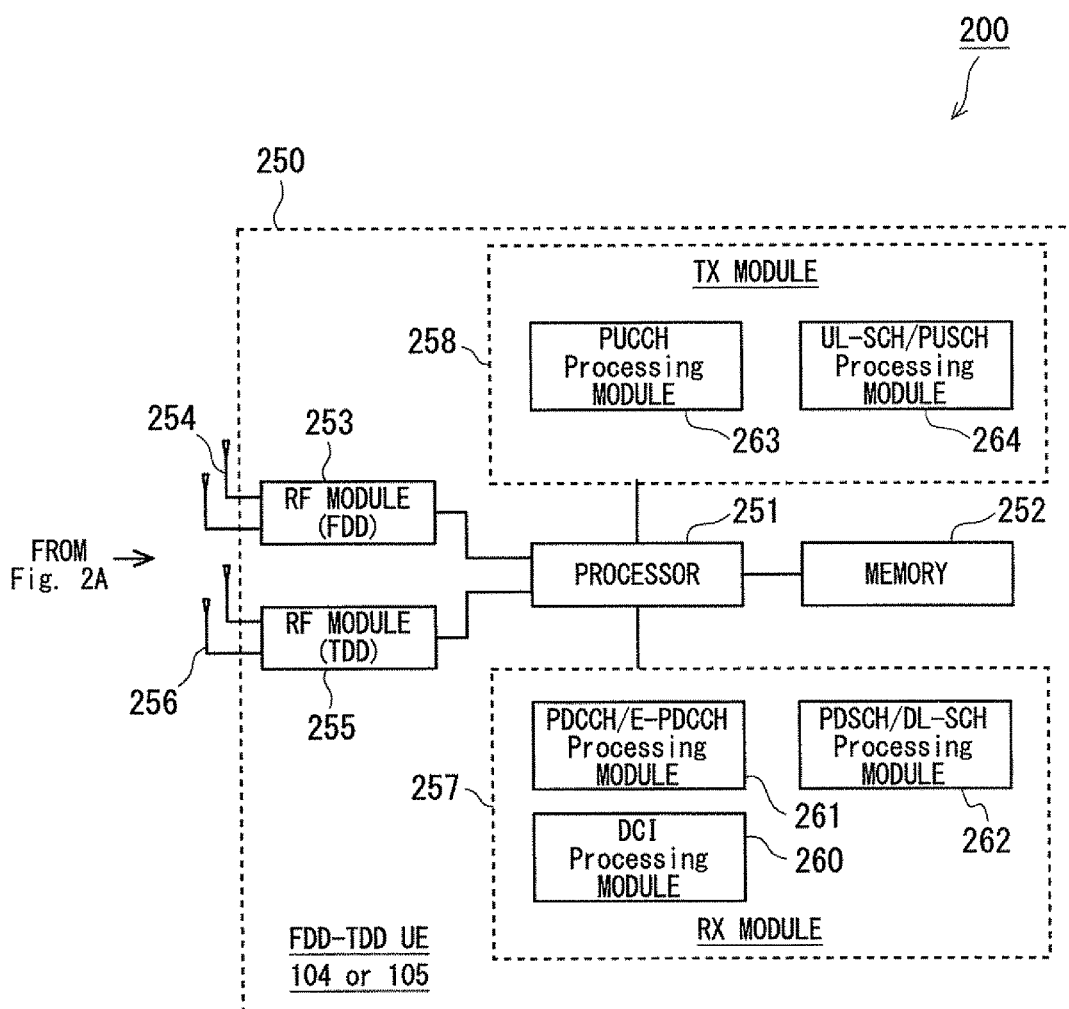
FIG. 2B contains simplified block diagrams of typical advanced base stations (eNBs), specifically a FDD access node and a TDD access node, and also a simplified block diagram of an advanced UE which is able to perform inter-system FDD-TDD CA.

FIG. 2A and FIG. 2B contain simplified block diagrams of typical advanced base stations. The advanced base station 210 represents a FDD access node (like an access node/eNB 101 for example). The advanced base station 230 represents a TDD access node (like an access node 103 for example). FIG. 2A and FIG. 2B also contain a simplified block diagram of an advanced UE 250 (representing a UE like UE 104 or 105 for example) which is able to perform inter system FDD-TDD CA.

As shown in FIG. 2A and FIG. 2B, an advanced FDD base station 210 may include:
  a processor 211;
  a memory 212 containing program instructions and databases;
  a FDD radio frequency (RF) module 213 having a transmitter operating on a DL carrier component and a receiver operating on an UL carrier component;
  an antenna array 214 for transmitting cellular radio frequency signals to UEs in the cell and receiving radio frequency signals from UEs in the cell;
  a transmit (TX) module 215 for performing DL transport channel and physical channel coding and signal processing as well as control signal and reference signal processing. The TX module 215 includes:
    a PDCCH/E-PDCCH processing module 221 for coding and physical channel processing of fast signalling;
    a PDSCH/DL-SCH processing module 222 for channel coding and physical channel processing of physical layer data channel(s); and
    a DCI Processing module 220 for encoding downlink control information supporting cross FDD-TDD carrier scheduling, as discussed further below;
  a receive (RX) module 216 for performing UL channel reception, signal processing, and channel decoding. The RX 216 module includes:
    a PUCCH Processing module 223 for UL control channel reception and decoding; and
    a PUSCH Processing module 224 for UL data channels reception and decoding;
  an UL Scheduling module 217 for handling scheduling timing for UL data transmission and issuing corresponding UL grant, as discussed further below; and
  a DL Scheduling module 218 for handling scheduling timing for DL data transmission to UE(s) and issuing corresponding DL scheduling information, as discussed further below.

As also shown in FIG. 2A and FIG. 2B, an advanced TDD base station 230 may comprise:
  a processor 231;
  a memory 232 containing program instructions and databases;
  a TDD radio frequency (RF) module 233 having a transmitter and receiver operating on the same carrier component;
  an antenna array 234 for transmitting and receiving cellular radio frequency signal to UEs and from UEs in the cell;
  a TX module 235 for performing DL transport channel and physical channel coding and signal processing as well as control signal and reference signal processing. The TX module 235 includes:
    a PDCCH/E-PDCCH processing module 241 for coding and physical channel processing of fast signalling;
    a PDSCH/DL-SCH processing module 242 for channel coding and physical channel processing of physical layer data channel(s); and
    a DCI Processing module 240 for encoding downlink control information supporting cross FDD-TDD carrier scheduling, as discussed further below;
  a RX module 236 for performing UL channel reception, signal processing, and channel decoding. The RX module 236 includes:
    a PUCCH Processing module 243 for UL control channel reception and decoding; and
    a PUSCH Processing module 244 for UL data channel reception and decoding;
  an UL Scheduling module 237 for handling scheduling timing for UL data transmission and issuing corresponding UL grant, as discussed further below;
  a DL Scheduling module 238 for handling scheduling timing for DL data transmission to UE(s) and issuing corresponding DL scheduling information, as discussed further below; and
  a TDD Reconfiguration module 239 for handling fast signalling information to indicate UL-DL reconfiguration, as discussed further below.

As further shown in FIG. 2A and FIG. 2B, an advanced UE 250 may comprise:

a processor 251;

a memory 252 containing program instructions and databases;

a—FDD radio frequency (RF) module 253 having a transmitter operating on UL carrier component and a receiver operating on DL carrier component;

antennas 254 for transmitting cellular radio frequency signal to a servicing FDD base station and receiving radio frequency signal from the servicing FDD base station;

a TDD radio frequency (RF) module 255 having a transmitter and a receiver operating on the same carrier component;

antennas 256 for transmitting and receiving cellular radio frequency signals to and from the servicing TDD base station;

a RX module 257 for performing DL transport channel and physical channel reception, signal processing and decoding. The RX module 257 includes:

a PDCCH/E-PDCCH processing module 261 for blind decoding of PDCCHs and/or E-PDCCH for DCI intended for it;

a PDSCH/DL-SCH processing module 262 for PDSCHs reception and signal processing and DL-SCHs decoding; and a DCI Processing module 260 for decoding downlink control information supporting cross carrier and non-cross carrier scheduling as well as fast signalling indicating UL-DL reconfiguration change, as discussed further below;

a TX module 258 for performing UL channel encoding and transmissions. The TX module 258 includes:

a PUCCH Processing module 263 for UL control channels encoding and transmission; and a PUSCH Processing module 264 for UL data channels encoding and transmission.

According to LTE Rel. 10 and 11 (in relation to CA), there are two methods specified for scheduling in carrier aggregation; self-scheduling and cross-carrier scheduling. Dedicated RRC signalling is used for informing a UE during SCell establishment whether cross-carrier scheduling is activated/configured. If cross-carrier scheduling is not configured then no carrier indicator field (CIF) is included in the DCI.

Figure 3:
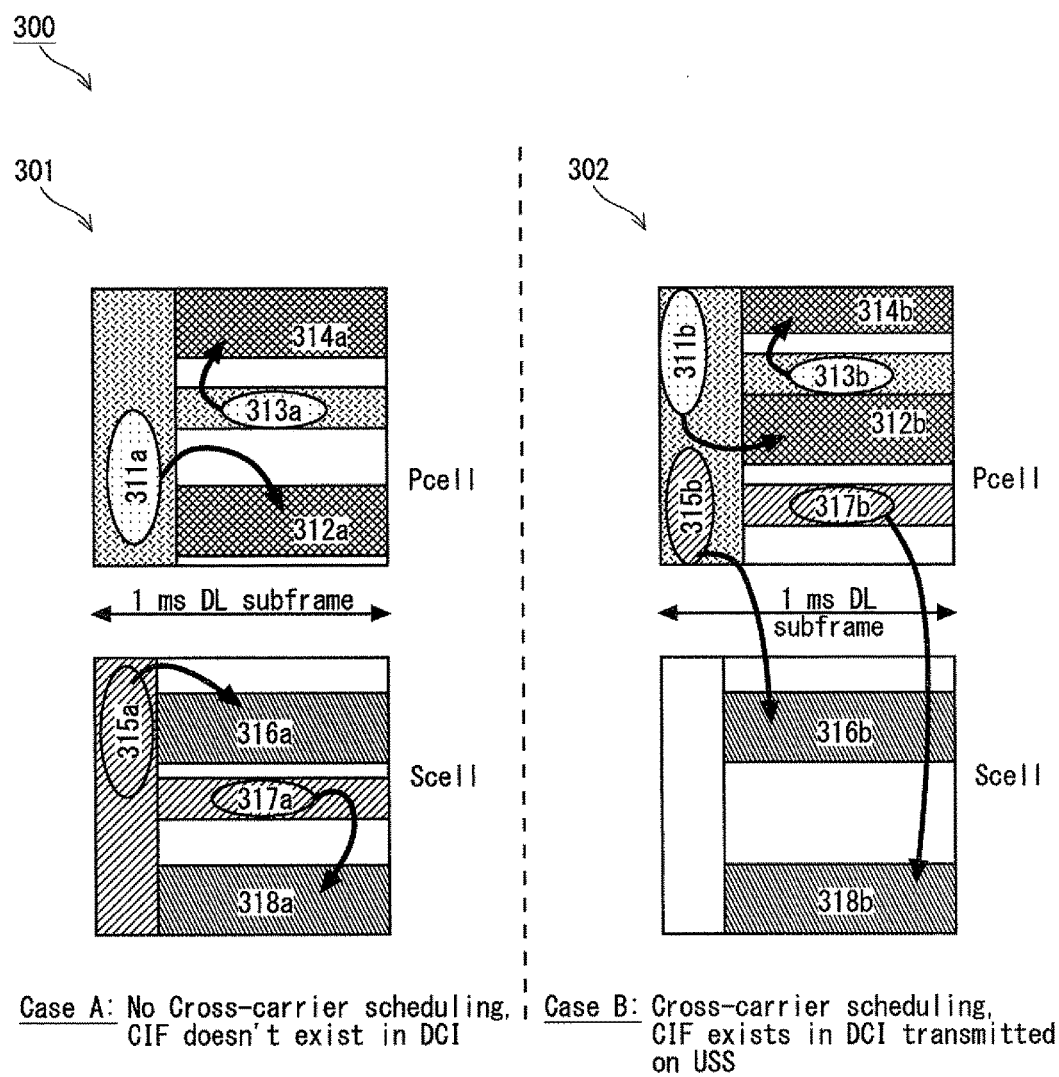
FIG. 3 is used to explain certain aspects of self-scheduling and cross-carrier scheduling in LTE CA systems.

For self-scheduling, downlink scheduling assignments are valid for the component carrier (PCell or SCell) upon which they are transmitted. Similarly, for uplink grants, there is an association between downlink and uplink component carriers such that each uplink component carrier has an associated downlink component carrier. The association is provided as part of the system information. Thus, from the uplink-downlink association, the terminal or UE will know to which uplink component carrier the downlink control information relates. Take DL scheduling as an example, as depicted as Case A 301 in FIG. 3, DL scheduling assignment 311a is sent on the same component carrier (PCell) as the associated PDSCH transmission (312a) and DL scheduling assignment 315a is sent on the same component carrier (SCell) as the associating PDSCH transmission 316a. The same scheme is applied for E-PDCCH and represented by 313a-314a for PCell and 317a-318a for SCell.

As discussed in the Background section above, the DCI for FDD operation and TDD operation is different in size for the same DCI format. If a FDD serving cell is configured as PCell and a TDD serving cell is configured as SCell and self-scheduling is configured, the blind decoding trial on each serving cell remains the same as in the Rel. 10 CA system since the number of different DCI sizes remains the same on each serving cell, although the size of the same DCI format is different for FDD and TDD serving cells.

For cross-carrier scheduling, PDSCH and/or PUSCH is transmitted on an (aggregated) component carrier(s) other than the carrier on which PDCCH is transmitted, and the carrier indicator field in the detected DCI provides information about the component carrier used by the base-station for transmitting associated PDSCH and/or PUSCH. For example, as shown in Case B 302 in FIG. 3, there are two UE-specific PDCCH transmissions (311b and 315b) for a single UE in PCell, one PDCCH (311b) for self-scheduling of the associating PDSCH (312b) is transmitted on the same carrier component (PCell), and the other PDCCH (315b) is transmitted on PCell for cross-carrier scheduling the associated PDSCH (316b) which is transmitted on the second carrier component (SCell). In this case, a UE only needs to monitor Common Search Space (CSS) and UE-specific Search Space (USS) on the PCell. As mentioned in the Background section, for the same DCI format, DCI for FDD and DCI for TDD are different in size. More specifically (as was also stated above):

In DCI format 0/4 for TDD operation, a 2-bit field is used for UL index or DL assignment index (DAI), but this 2-bit field does not exist in DCI format 0/4 for FDD operation;

In DCI format 1/1A/1B/1D/2/2A/2B/2C for TDD operation, a 2-bit field is used for DL assignment index, but this 2-bit field does not exist in DCI format 1/1A/1B/1D/2/2A/2B/2C for FDD operation;

In DCI format 1/1A/1B/1D/2/2A/2B/2C for TDD operation, a 4-bit field is used for HARQ process number, but there is a 3-bit field in DCI format 1/1A/1B/1D/2/2A/2B/2C for FDD operation.

For cross-carrier scheduling, if the content of DCI formats of a TDD and FDD serving cell remain the same as in Rel.10 or 11, then the number of blind decoding trials will increase two fold in UE specific search space because of the doubled number of different DCI format sizes, and this requires higher processing power at the UE side (which may in turn lead to, for example, reduced battery life, etc).

One important aspect of the present disclosure relates to establishing a timing rule for inter-system FDD-TDD CA and to reduce the blind decoding trials in inter-system FDD-TDD CA with cross carrier scheduling enabled where the FDD carrier is the PCell and TDD carrier(s) is/are the SCell(s) (i.e. as in the first deployment scenario 110 discussed above). In order to reduce the blind decoding number, it is thought to be desirable to have a DCI format of the same size used for self-carrier scheduling and cross-carrier scheduling. If the DCI format sent on the PCell used for cross-carrier scheduling transmission on the TDD SCell has the same size as DCI format used for self-scheduling transmission on the FDD PCell, or via-versa, then the maximum blind decoding number can remain the same as in Rel. 10 and 11.

At this point (and in the context of designing a DCI format of the same size for FDD and TDD), it is important to understand why a TDD system needs 4 bits to represent the HARQ process number while a FDD system only needs 3 bits. According to previously proposed LTE FDD, the transmission of one transport block and the feedback H-ARQ acknowledgement each take 1 ms (or 1 subframe), and the decoding of a transport block and the H-ARQ acknowledgement processing time at the UE and eNB side take up to 3 ms, respectively. Thus, the Round Trip Time (RTT) from sending a transport block to having H-ARQ Acknowledgement in LTE is at least 8 ms and the number of HARQ processes is equal to the number of DL subframes within the RTT.

Figure 4:
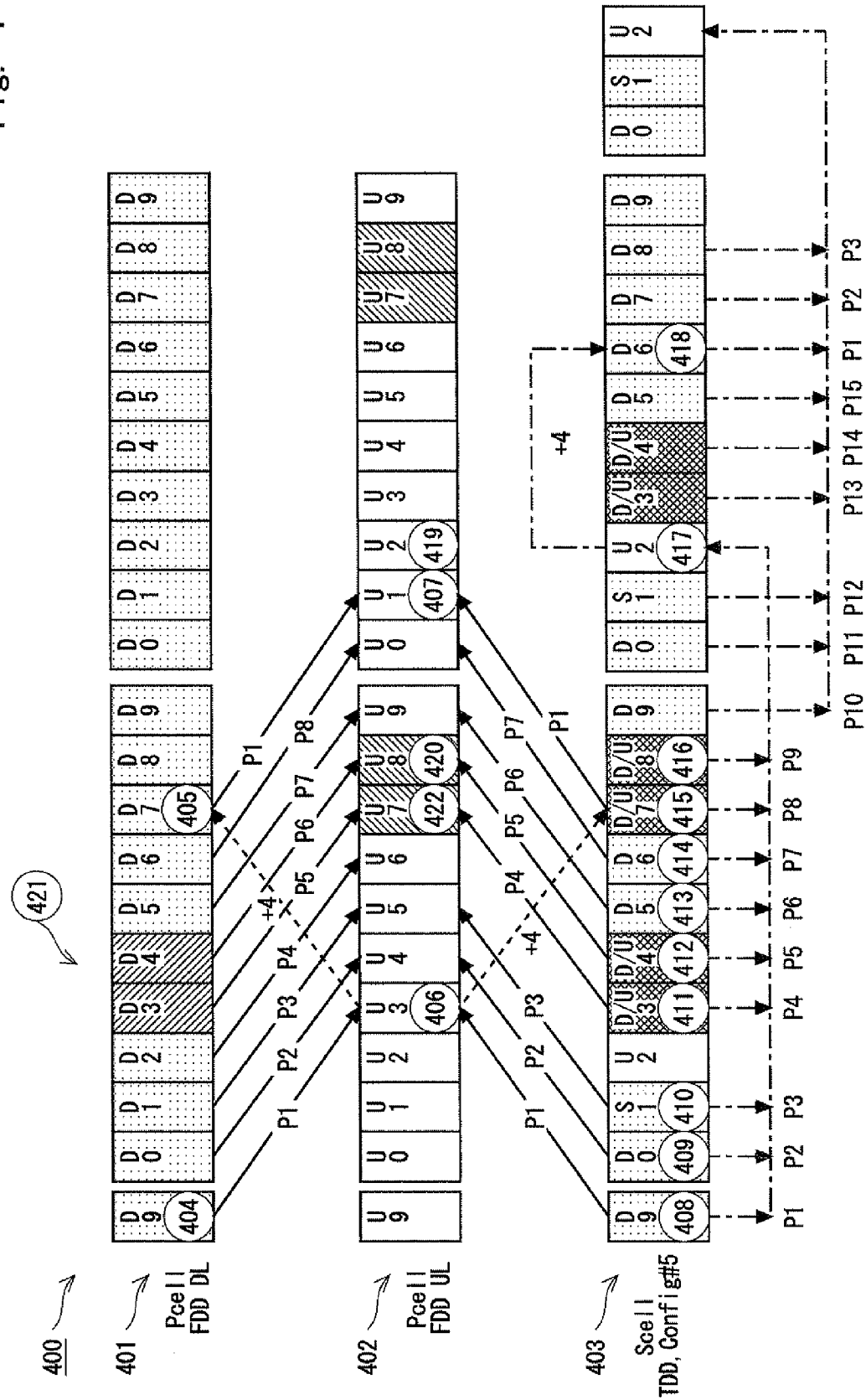
FIG. 4 contains a diagram which is used to assist in explaining the timing of transmissions in LTE FDD-TDD CA in one scenario.

This is explained further by way of example in FIG. 4. For a legacy FDD serving cell 401, it takes 1 ms to transmit a DL transport block on DL subframe #9 404. At the UE side, it takes up 2.5 ms from the end of subframe #9 to process the received transport block and hence H-ARQ Acknowledgement is sent in UL subframe #3 406. At the base station/eNB side, after receiving the H-ARQ Acknowledgement on UL subframe #3 406, it takes the base station/eNB 3 ms from the end of UL subframe #3 to prepare the new transmission (or retransmission), and hence the next transport block is transmitted on DL subframe #7 405. A UE will hold one HARQ process for one DL transmission until this transmission is correctly received, and as a result, the UE still uses HARQ-process-1 for retransmission on DL subframe #7 405, as depicted in FIG. 4. In an extreme case, assuming one UE is scheduled on all DL subframes, then there are 8 DL transmissions within one RTT interval, and at most 8 HARQ processes are needed. As a result, a 3-bit IE is required in the UE specific DL DCI to represent the 8 H-ARQ processes.

For a legacy TDD serving cell with UL-DL configuration #5 403, as depicted in the example in FIG. 4, H-ARQ acknowledgement for DL transmissions received by a UE on subframes #9 408, #0 409, #1 410, #3 411, #4 412, #5 413, #6 414, #7 415, #8 416 are fed back to the serving base-station on UL subframe #2 417 in the next upcoming radio frame. The earliest possible chance for retransmission is on DL subframe #6 418. In an extreme case, assuming one UE is scheduled on all DL subframes, there are then 15 DL transmissions within one RTT which need independent HARQ processes. As a result, a maximum of 15 HARQ processes are needed for TDD configuration #5 (i.e. P1 to P15), and hence a 4-bit IE is required in order to represent these in DCI. In addition, since HARQ-ACK of multiple TDD DL subframes should be fed back on one TDD UL subframe, a 2-bit Downlink Assignment Index (DAI) is included in DCI for a UE to detect any miss detection.

Self-scheduling in inter-system FDD-TDD CA with a FDD PCell and TDD SCell(s)

For self-scheduling in inter-system FDD-TDD CA with a FDD PCell and TDD SCell(s), the HARQ-ACK corresponding to PDSCH transmitted by a TDD SCell and received by a UE on DL subframe #0 408 may be transmitted either on UL subframe #2 419 of PCell (if there is no PUSCH scheduled to be transmitted in SCell) or on UL subframe #2 417 of SCell (included in PUSCH). If the HARQ-ACK is fed back on the FDD serving cell using PUCCH, then the FDD serving cell will forward the received feedback information to the TDD serving cell via backhaul 229 (backhaul 229 is shown in the schematic representation in FIG. 2A and FIG. 2B), and the TDD SCell will take care of the new transmission or retransmission using the TDD timing rule. If the HARQ-ACK is fed back on a TDD serving cell on PUSCH, then the TDD serving cell will take care of the new transmission or retransmission using the TDD timing rule. The signalling procedure is the same as in the Rel.10 or 11 CA system, although the two base stations being joined/used for CA are configured with different duplex modes.

Cross-carrier scheduling in inter-system FDD-TDD CA with a FDD PCell and TDD SCell(s)

For cross-carrier scheduling in inter-system FDD-TDD CA with a FDD PCell and TDD SCell(s), the HARQ-ACK related to PDSCH transmissions on a TDD serving cell on DL subframe #0 408 is fed back on FDD PCell UL subframe #3 406 using the FDD PCell timing rule and the FDD serving cell will perform scheduling for the TDD SCell new transmission or retransmission on DL subframe #7 415 on TDD serving cell using FDD PCell timing rule or on the first incoming DL subframe immediately after subframe #7 if subframe #7 happens to be an UL subframe. Since there are only 7 DL subframes in the RTT interval in the UL-DL configuration shown (which is TDD UL-DL configuration #5—note this configuration is shown as a worst case), the maximum HARQ process number is 7, which requires 3 bits for HARQ process numbering. Furthermore, since there is a one-to-one mapping between a DL transmission subframe and a UL subframe for HARQ-ACK feedback, the DAI IE on DCI format is no longer required. As a result, a DCI format transmitted on FDD PCell for self-scheduling and another DCI format transmitted on FDD PCell for cross-carrier scheduling for SCell transmission/reception can have the same size and the blind decoding is not impacted.

In view of the foregoing, one important proposal presented herein (for the case of inter-system FDD-TDD CA with a FDD PCell and TDD SCell(s)) is that when cross-carrier scheduling is configured for the SCell, the HARQ-ACK timing and UL scheduling timing for a UE on the TDD serving cell shall follow the specification of the FDD system.

Another important proposal presented here in (again, for the case of inter-system FDD-TDD CA with a FDD PCell and TDD SCell(s)) is that when cross-carrier scheduling is configured for the SCell, the DCI transmitted on the FDD serving cell for cross-carrier scheduling the TDD serving cell has the same IE as the DCI format for the FDD serving cell.

Yet another important proposal presented here in (again, for the case of inter-system FDD-TDD CA with a FDD PCell and TDD SCell(s)) is that when self-scheduling is configured for the SCell, the specification of legacy TDD system is followed.

Following on from the discussion above, which (it should be recalled) is associated with the first deployment scenario, the procedures that may be implemented at a FDD base station 210, a TDD base station 230 and an inter-system FDD-TDD CA capable UE 250, which together form a system supporting inter-system FDD-TDD CA may be as follows.

For an inter-system FDD-TDD CA capable UE 250 that initially detects a FDD macro-base station 210 and establishes RRC connection with the advanced mobile network through the said macro-base station 210 on the FDD carrier 270, while in RRC-Connected mode the said UE 250 may be configured, by the advanced mobile network through the said macro base station 210 using dedicated RRC signalling, to measure and add one or more TDD small cells each serviced by a TDD pico-base-station 230 as aggregated TDD SCell(s). Cross-carrier scheduling may be configured for data transmission/reception on aggregated TDD SCell(s).

If cross-carrier scheduling is enabled, at the network side (i.e. at the base station 210 and each base station 230), the DL Scheduling module 218 of the PCell FDD base station 210 shall schedule DL data transmission on both the FDD PCell and TDD SCell(s) via backhaul 229. The UE is expected to follow the FDD timing and feedback rule for feeding back HARQ-ACKs in response to data received on the FDD PCell DL carrier and TDD SCell DL carrier(s) to the FDD PCell base station. The DL Scheduling module 218 of the PCell FDD base station 210 shall configure the DCI processing module 220 to use FDD DCI format(s) to inform the said UE of DL data transmissions on the FDD PCell DL carrier and the TDD SCell DL carrier(s) (i.e. DCI with a 3-bit HARQ number field and no DAI field).

Furthermore, if cross-carrier scheduling is enabled, the UL Scheduling module 217 of the PCell FDD base station 210 shall schedule UL data transmission from UE on both the FDD PCell and the TDD SCell and configure the DCI processing module 220 to transmit UL grants for FDD PCell transmission and TDD SCell transmission using the FDD UL scheduling timing rule.

If cross-carrier scheduling is enabled and the UE 250 is configured to perform inter-system FDD-TDD CA with a FDD PCell and TDD SCell(s), in processing DCI at the DCI processing module 260, UE 250 will assume that a DCI of the same size (i.e. 3-bits HARQ process number field and no DAI bit field for scheduling DL transmission DCI) received on the FDD PCell provides DL scheduling and UL scheduling for both the PCell and SCell(s). Upon reception of DL scheduling for the SCell, UE 250 will apply the FDD timing rule for feeding back HARQ-ACKs to the FDD PCell. Upon reception of UL grant for UL data transmission on the TDD SCell UL carrier, UE 250 will apply the FDD timing rule for transmitting PUSCH to the TDD SCell.

If cross-carrier scheduling is not configured (or if it is disabled), at the network side the DL Scheduling module 218 of the PCell FDD base station 210 shall schedule DL data transmission only on the FDD PCell and the DL Scheduling module 238 of SCell TDD base station 230 shall schedule DL data transmission only on the TDD SCell. The UE 250 is expected to follow the FDD timing and feedback rule for feeding back to the FDD PCell base station HARQ-ACKs in response to data received on FDD PCell DL carrier, and to follow the TDD timing and feedback rule for feeding back to the TDD SCell base station(s) HARQ-ACKs in response to data received on TDD SCell DL carrier(s). Upon reception of HARQ-ACK of SCell on PUCCH, the FDD PCell base station shall forward the received SCell HARQ-ACK to the SCell via backhaul 229. The DL Scheduling module 218 of the PCell FDD base station 210 shall configure the DCI processing module 220 to use FDD DCI format(s) to inform the said UE of DL data transmission on the FDD PCell DL carrier and the DL Scheduling module 238 of the SCell TDD base station 230 shall configure DCI processing module 240 to use TDD DCI format(s) to inform the said UE of DL data transmission on TDD SCell DL carrier(s) (i.e. TDD DCI with 4-bits HARQ number field and 2-bits DAI field).

Furthermore, if cross-carrier scheduling is disabled, the UL Scheduling module 217 of the PCell FDD base station 210 shall schedule UL data transmissions from the UE on the FDD PCell and configure DCI processing module 220 to transmit UL grants for FDD PCell transmission using the FDD UL scheduling timing rule. The UL Scheduling module 237 of the SCell TDD base station 230 shall schedule UL data transmission from the UE on the TDD SCell and configure DCI processing module 240 to transmit UL grants for TDD SCell transmission using the TDD UL scheduling timing rule.

If cross-carrier scheduling is disabled and the UE is configured to perform FDD-TDD inter system CA with a FDD PCell and TDD SCell(s), in processing DCI received on the SCell at DCI processing module 260, the UE 250 will assume that a received TDD DCI (i.e. 4-bits HARQ process number field and 2-bits DAI field) provides DL scheduling and UL scheduling for SCell(s). Upon reception of DL scheduling for SCell, UE 250 will apply the TDD timing rule for feeding back HARQ-ACKs on PUCCH to the FDD PCell. Upon the reception of UL grant for UL data transmission on TDD SCell UL carrier, the UE 250 will apply the TDD timing rule for transmitting PUSCH to the TDD SCell.

Another important aspect of the present disclosure relates to establishing a timing rule for inter-system FDD-TDD CA to reduce blind decoding trials in inter-system FDD-TDD CA with cross carrier scheduling enabled where a TDD carrier is the PCell and a FDD carrier is the SCell (i.e. as in the second deployment scenario 111 discussed above).

Self-scheduling in inter-system FDD-TDD CA with a TDD PCell and FDD SCell) For self-scheduling (i.e. where cross-carrier scheduling is disabled) in inter-system FDD-TDD CA where a TDD carrier is the PCell and a FDD carrier is the SCell, the HARQ-ACK timing and UL grant timing of the TDD serving cell (PCell) follows the legacy TDD specification. Referring to the timing illustrated by FIG. 5, HARQ-ACKs for two DL PDSCH transmissions on the TDD serving cell, namely on subframe #0 513 and subframe #1 514, are fed back on TDD UL subframe #7 516. For the FDD serving cell on the other hand, DL HARQ-ACK timing cannot still follow the legacy FDD specification since a UE transmits PUCCH only on the PCell. Therefore, referring to FIG. 5, the two DL transmissions on FDD DL subframe #0 508 and subframe #1 509 cannot be fed back on UL subframe #4 504 and UL subframe #5 505 using PCell PUCCH. There is no guarantee that there will be an UL Grant for PUSCH transmission on FDD UL subframe #4 504 and UL subframe #5 505 where HARQ-ACK can be piggybacked.

In order to feedback the HARQ-ACK for DL transmission, subframes on the FDD serving cell with the same transmission direction as subframes on the TDD serving cell should follow the HARQ-ACK timing of TDD serving cell.

For DL subframes (for example DL subframe #2 510 and DL subframe #3 511) on the FDD serving cell which have a different transmission direction to subframes (for example subframe #2 518 and subframe #3 519) on the TDD serving cell, there are two options for HARQ-ACK timing:

Option 1: associate with previous DL transmissions in DL subframe #0 508 and DL subframe #1 509 and feedback on UL subframe #7 using the TDD timing rule, either on the FDD serving cell on PUSCH or on the TDD serving cell on PUCCH.

Option 2: associate with the incoming DL transmission in DL subframe #4 512 and feedback on UL subframe #8 using the TDD timing rule, either on the FDD serving cell using PUSCH or on the TDD serving cell using PUCCH.

Option 1 has the advantage of shorter HARQ-ACK feedback delay, however, according to TDD system, W(DL, DAI) in a DCI carrying UL grant transmitted on DL subframe #1 514 cannot include future DL transmissions that may be dynamically scheduled in the subframe #2 510 and/or subframe #3 511, as a result, this may cause ambiguity between base-station and UE and HARQ-ACK bits should always be fed back for these DL transmissions in order to avoid ambiguity between eNB and UE.

Option 2, on the other hand, does not have this ambiguity problem since DL transmissions on DL subframe #2 510 and DL subframe #3 511 are scheduled to be transmitted on DL subframe(s) before the subframe that UL grant is sent on TDD PCell. In comparison with Option 1, there is an additional one subframe delay for HARQ-ACK feedback.

In terms of HARQ-ACK timing for UL transmission, the legacy FDD timing can be followed since there is no restriction on the PHICH resource. For UL grant timing, the legacy FDD timing can also be followed.

Cross-carrier scheduling in inter-system FDD-TDD CA with a TDD PCell and a FDD SCell)

Figure 5:
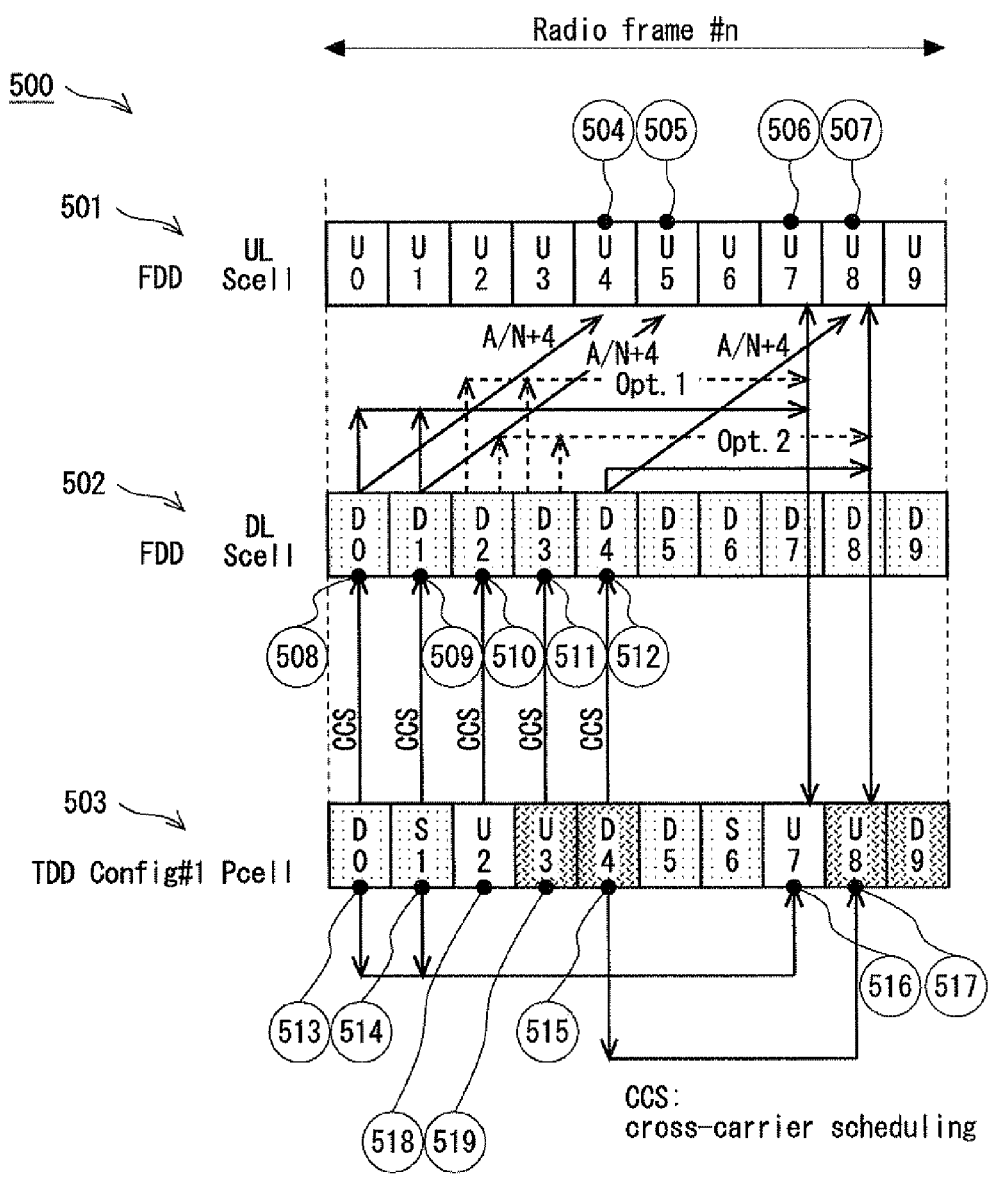
FIG. 5 contains diagrams which are used to assist in explaining the operation of LTE FDD-TDD CA in another scenario.

For cross-carrier scheduling in inter-system FDD-TDD CA where a TDD carrier is the PCell and a FDD carrier is the SCell, there is no guarantee that all FDD SCell subframes can be cross-carrier scheduled due to the difference in transmission direction between the TDD PCell and the FDD SCell. A UE configured for cross-carrier scheduling shall only monitor CSS and USS on the scheduling serving cell (i.e. on the TDD PCell in this case). Referring to FIG. 5, FDD DL transmission on DL subframe #0 508 and subframe #1 509 can be cross-carrier scheduled, since the corresponding subframes on TDD PCell are used as DL subframe. However, there are no PDSCH transmissions on FDD SCell DL subframe #2 and subframe#3 because no PDCCH for cross-carrier scheduling can be sent on the corresponding subframes on the TDD PCell which are configured as UL subframes. There are similar problems for UL grant.

In order to alleviate this restriction, cross-subframe-cross-carrier scheduling or multiple-subframe-cross-carrier scheduling can be adopted, especially when channel conditions do not change rapidly. For instance, PDCCH corresponding to PDSCH transmission on DL subframe #2 510 and subframe #3 511 can be transmitted on DL subframe #0 513 and/or DL subframe #1 514. Similarly, restriction in UL scheduling can also be solved.

Figure 6:
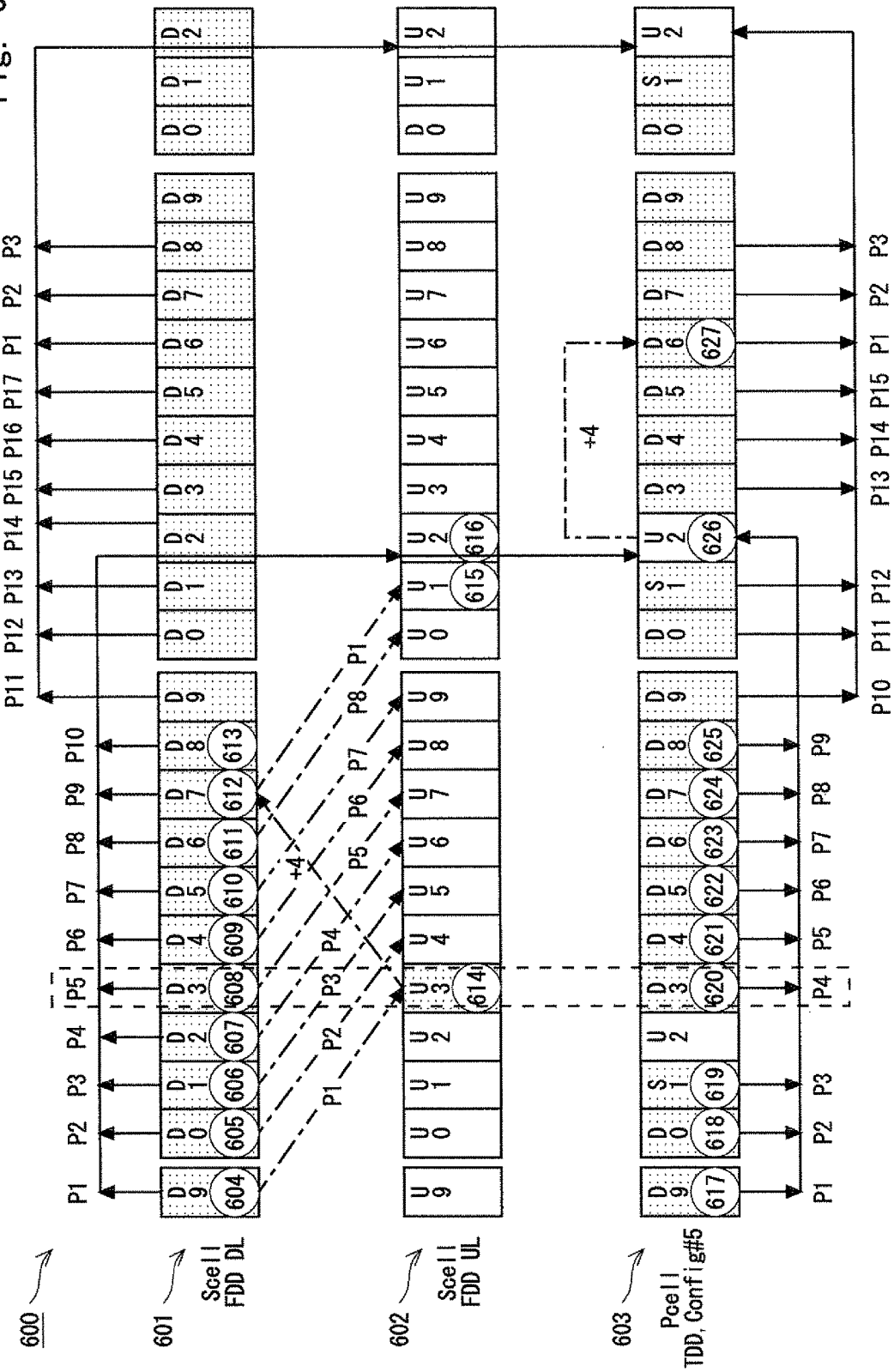
FIG. 6 contains diagrams which are used to assist in explaining the operation of LTE FDD-TDD CA in another scenario.

In reference to FIG. 6, a TDD serving cell with TDD configuration #5 is configured as the PCell and a FDD serving cell is configured as the SCell. By following the HARQ timing of the TDD serving cell, HARQ-ACK related to FDD SCell DL transmission on FDD DL subframe #9 604, subframe #0 605, subframe #1 606, subframe #2 607, subframe #3 608, subframe #4 609, subframe #5 610, subframe #6 611, subframe #7 612 and subframe #8 613 are fed back either on FDD SCell UL subframe #2 616 using PUSCH, or on TDD PCell UL subframe #2 626 using PUCCH. Since the HARQ RTT equals 17 DL subframes in this worst case scenario, 17 independent HARQ processes are needed, which in turn requires 5 HARQ-ACK bits. Furthermore, HARQ-ACK of multiple FDD DL subframes are fed back on one UL subframe (either 616 or 626), and a 2-bit DAI should be included in DCI to find any miss-detection within the DL association set. Adding 5 HARQ-ACK bits and 2 DAI bits into the existing FDD DCI will result in one bit more than (i.e. an additional bit in comparison with) the existing TDD DCI of the same format and this will in turn result in increasing the number of blind decodings. Therefore, it is proposed that the number of bits for HARQ-ACK be restricted to 4 thereby supporting up to 16 H-ARQ processes. This creates DCI format for FDD SCell having 4 HARQ-ACK bits and 2 bits DAI making a FDD SCell DCI having the same size as TDD PCell DCI and hence keeping the number of blind decoding the same as Rel.10 or 11.

In view of the foregoing, a further important proposal presented herein (this time for the case of cross-carrier scheduling in inter-system FDD-TDD CA with a TDD PCell and a FDD SCell) is that 1 additional bit for HARQ-process number and a 2-bit DAI should be included in UE specific DCI format for FDD serving cell, regardless of whether PDCCH is transmitted on FDD SCell or TDD PCell.

Another important proposal presented herein (this time for the case of inter-system FDD-TDD CA with a TDD PCell and a FDD SCell) is that, for self-scheduling, DL subframes on the FDD SCell with corresponding UL subframes on the TDD PCell should be fed back together with the incoming DL transmission on DL subframe which corresponds to DL subframe on TDD PCell.

Yet another important proposal presented herein (again for the case of inter-system FDD-TDD CA with a TDD PCell and a FDD SCell) is that:

HARQ-timing of DL transmission should follow the timing of TDD system, and

HARQ-timing of UL transmission and UL grant timing for the FDD serving cell should follow the timing of FDD system when cross-carrier scheduling is not configured, otherwise, the timing of TDD system is followed.

Following on from the discussion above, which (it should be recalled) is associated with the second deployment scenario, the procedures that may be implemented at a FDD base station 210, a TDD base station 230 and an inter-system FDD-TDD CA capable UE 250, which together form a system supporting inter-system FDD-TDD CA, may be as follows.

For an inter-system FDD-TDD CA capable UE 250 that initially detects a TDD pico-base station 230 and establishes RRC connection with the advanced mobile network through the said pico-base station 230 on TDD carrier 280, while in RRC-Connected mode the said UE may be configured, by the advanced mobile network through the said pico-base station 230 using dedicated RRC signalling, to measure and add a FDD macro cell serviced by a FDD macro base-station 210 as an aggregated FDD SCell. Cross-carrier scheduling may be configured for data transmission/reception on aggregated FDD SCell 270.

If cross-carrier scheduling is enabled, the DL Scheduling module of 238 of the PCell TDD base station 230 shall schedule DL data transmission on both the TDD PCell and FDD SCell via backhaul 229. The UE 250 is expected to follow the TDD timing and TDD feedback rule for feeding back HARQ-ACKs in response to data received on the TDD PCell DL carrier and on the FDD SCell DL carrier to the TDD PCell base station 230. The DL Scheduling module 238 of the PCell TDD base station 230 shall configure the DCI processing module 240 to use TDD DCI format(s) to inform the said UE 250 of DL data transmission on the TDD PCell DL carrier 280 and on the FDD SCell DL carrier(s) 270 (i.e. DCI with 4-bits HARQ number field and 2-bits DAI field).

Furthermore, if cross-carrier scheduling is enabled, the UL Scheduling module 237 of the PCell TDD base station 230 shall schedule UL data transmission from the UE on both the TDD PCell and the FDD SCell and configure DCI processing module 240 to transmit UL grants for TDD PCell transmission and FDD SCell transmission using the TDD UL scheduling timing rule.

If cross-carrier scheduling is enabled and UE 250 is configured to perform FDD-TDD inter system CA with a TDD PCell and a FDD SCell, in processing DCI at the DCI processing module 260, the UE 250 will assume that a TDD DCI of the same size (i.e. 4-bits HARQ process number field and 2-bits DAI field for scheduling DL transmission DCI) received on the TDD PCell carrier 280 provides DL scheduling and UL scheduling for both TDD PCell and FDD SCell. Upon reception of DL scheduling and DL data for SCell, the UE 250 will apply the TDD timing rule for feeding back HARQ-ACKs to the TDD PCell. Upon the reception of UL grant for UL data transmission on the FDD SCell UL carrier 270, the UE 250 will apply the TDD timing rule for transmitting PUSCH to the FDD SCell.

If cross-carrier scheduling is not configured (or if it is disabled), at base station 230 the DL Scheduling module 238 of the PCell TDD base station 230 shall schedule DL data transmission only on TDD PCell and the DL Scheduling module 218 of the SCell FDD base station 210 shall schedule DL data transmission only on FDD SCell. The UE is expected to follow the TDD timing and TDD feedback rule for feeding back to the TDD PCell base station HARQ-ACKs in response to data received on TDD PCell DL carrier 280, and to follow the PCell's TDD timing and TDD feedback rule for feeding back to the FDD SCell base station HARQ-ACKs in response to data received on FDD SCell DL carrier 270. Additionally, a UE is expected to feedback HARQ-ACK of data scheduled on DL subframe(s) on FDD SCell with corresponding UL subframe(s) on TDD PCell, together with the incoming DL transmission on DL subframe which corresponds to DL subframe on TDD PCell. Upon the reception of HARQ-ACK of SCell on PUCCH, TDD PCell base station 230 shall forward the received SCell HARQ-ACKs to FDD SCell 210 via backhaul 229. The DL Scheduling module 238 of the PCell TDD base station 230 shall configure DCI processing module 240 to use TDD DCI format(s) to inform the said UE of DL data transmission on TDD PCell DL carrier 280 and the DL Scheduling module 218 of SCell FDD base station 210 shall configure DCI processing module 220 to use TDD DCI format(s) to inform the said UE of DL data transmission on FDD SCell DL carrier 270 (i.e. TDD DCI with 4-bits HARQ number field and 2-bits DAI field).

Furthermore, if cross-carrier scheduling is disabled, the UL Scheduling module 237 of TDD PCell base station 230 shall schedule UL data transmission from the UE on TDD PCell and configure DCI processing module 240 to transmit UL grants for TDD PCell transmission using the TDD UL scheduling timing rule. The UL Scheduling module 217 of the SCell FDD base station 210 shall schedule UL data transmission from the UE on FDD SCell carrier 270 and configure DCI processing module 220 to transmit UL grants for FDD SCell transmission using FDD UL scheduling timing rule and FDD HARQ-ACK rule.

If cross-carrier scheduling is disabled and UE 250 is configured to perform FDD-TDD inter system CA with a TDD PCell and a FDD SCell, in processing DCI received on FDD SCell DL carrier 270 at DCI processing module 260, UE 250 will assume that a TDD DCI (i.e. 4-bits HARQ process number field and 2-bits DAI field for scheduling DL transmission DCI) received provides DL scheduling and UL scheduling for SCell. Upon the reception of DL scheduling and transmitted data for SCell, UE 250 will apply the TDD timing rule for feeding back HARQ-ACKs to the FDD SCell. Additionally, upon reception of DL scheduling and transmitted data for FDD SCell DL subframe(s) with corresponding UL subframe(s) on TDD PCell, a UE will feedback HARQ-ACK for data scheduled on those DL subframe(s), together with the incoming DL transmission on DL subframe which corresponds to DL subframe on TDD PCell. Upon reception of UL grant for UL data transmission on FDD SCell UL carrier, UE 250 will apply the FDD timing rule for transmitting PUSCH to the FDD SCell.

Yet another important aspect of the present disclosure relates to enabling inter-system FDD-TDD CA where a FDD carrier is the PCell and a flexible-TDD carrier (i.e. TDD eIMTA) is the SCell (i.e. as in the third deployment scenario 112 discussed above).

For TDD eIMTA systems, two particular challenges are of present relevance. One of these is how to transmit the fast TDD configuration indication. The other is how to feed back the HARQ-ACK for UL and DL transmission, and how to determine UL grant timing. For the first challenge, a working assumption has been made and explicit UE common physical layer signalling shall be used to inform the eIMTA enabled UE of the fast TDD configuration. For the second challenge, an accepted solution is yet to be found.

For LTE FDD-TDD inter-system CA, it is also possible to enable flexible-TDD on a TDD serving cell and thus the abovementioned problem also should be solved, and more importantly, the solution may not necessarily be the same as that for TDD eIMTA systems without FDD-TDD CA operation.

According to legacy LTE systems, for carrier aggregation capable UE(s), the system information for the SCell is provided to a UE using dedicated RRC signalling (i.e. as a RRCConnectionReconfiguration message) utilising PCell connectivity as part of the procedure to configure the additional SCell. Using dedicated signalling instead of reading the system information on the SCell enables faster activation of SCell as the terminal otherwise would have to wait until the relevant system information had been transmitted. Once a SCell(s) is configured and activate, UE shall only monitor CSS and USS on PCell and USS on SCell in the absence of cross-carrier scheduling. If UE is configured with cross-carrier scheduling, UE shall only monitor CSS and USS on PCell.

In FDD-TDD inter-system CA, CSS on TDD SCell may not available. Technically in this case, dedicated RRC signalling through PCell can be used to inform FDD-TDD CA capable UE(s) of the updated instantaneous TDD UL-DL configuration. However, this may not be fast enough to meet the requirement of flexible-TDD to reflect the actual instant traffic in the cell. Accordingly, two options are proposed to indicate the transmission direction of flexible subframes in TDD SCell(s):

Option 1: design explicit UE common physical layer signalling on the FDD serving cell to send the fast TDD configuration indication for the TDD serving cell.

Option 2: implicitly convey the transmission direction by related DL/UL scheduling.

For Option 1, the fast TDD configured signalling designed for LTE eIMTA system can be reused and transmitted on FDD PCell in LTE FDD-TDD inter-system CA. A UE configured with flexible-TDD will monitor common physical layer signalling on the PCell and try to decode the fast TDD configuration indication for TDD SCell. Since the new DCI format for fast TDD reconfiguration is expected to be the same size as the existing DCI, for instance, DCI format 1C, then the total blind decoding on FDD PCell can be kept the same. This option is workable for both cross-carrier scheduling enabled and disabled.

For Option 2, no explicit signalling is transmitted for fast TDD reconfiguration, and the transmission direction is inferred from the cross-carrier scheduling information sent on FDD PCell. Refer to FIG. 4 as an example, and assume a UE does not know the instantaneous TDD UL-DL configuration of the TDD SCell. According to the Rel.10/11 specification, a UE shall monitor USS and CSS on PCell and try to detect PDCCH for self-scheduling on FDD PCell and cross-carrier scheduling on TDD SCell(s). If the UE detects PDCCH on FDD PCell for cross-carrier scheduled DL transmission on TDD flexible DL subframe such as DL subframe #3 411 and DL subframe #4 412, it shall try to decode the assigned PDSCH transmission on TDD SCell and feedback the related HARQ-ACK according to the timing of the FDD system. To be specific, HARQ-ACK for PDSCH transmission on TDD SCell on DL subframe #3 411 and DL subframe #4 412 shall be fed back on FDD PCell UL subframe #7 422 and UL subframe #8 420 respectively.

In this regard, it is proposed herein that whether a flexible subframe(s) on TDD SCell is used as a DL subframe can be determined based on the detection of PDCCH on FDD PCell for cross-carrier scheduling of PDSCH transmission on TDD SCell.

Similarly, the UL grant timing for a TDD SCell also follows the specification of the FDD system, in other words the delay between an UL grant and the related PUSCH transmission is always 4 ms. Referring again to FIG. 4 as an example, PUSCH scheduled for transmission on TDD SCell on UL subframe #8 416 is triggered by UL grant transmitted on FDD PCell on DL subframe #4 412. As a result, if the UE detects a UL grant on FDD PCell on DL subframe #4 for cross-carrier scheduled PUSCH transmission on TDD SCell, the UE shall be aware that flexible subframe #8 416 is used as an UL subframe for flexible-TDD SCell when it detects UL grant transmitted on FDD PCell on DL subframe #4 411.

It is proposed herein that whether a flexible subframe is used as UL subframe can be determined based on the detection of PDCCH on FDD serving cell for cross-carrier scheduling of PUSCH transmission on TDD serving cell.

From the above description, we can tell that the HARQ-ACK feedback for cross-carrier scheduled PDSCH on the TDD serving cell is unrelated to the actual fast TDD configuration. Whether a flexible-subframe is used as a DL subframe is determined by the detection of PDCCH on FDD serving cell for cross-carrier scheduling of a PDSCH transmission on TDD serving cell.

According to the discussion above, which (it should be recalled) is associated with the third deployment scenario, the procedures that may be implemented at a FDD base station 210, a TDD base station 230 and an inter-system FDD-TDD CA capable UE 250, which together form a system supporting inter-system FDD-TDD CA, may be as follows.

For a FDD-TDD inter-system CA capable UE 250 that initially detects a FDD macro base station 210 and establishes RRC connection with the advanced mobile network through the said macro base station on FDD carrier 270, while in RRC-Connected mode the said UE 250 may be configured, by the advanced mobile network through the said macro base station 210 using dedicated RRC signalling, to measure and add one or more flexible TDD small cells each serviced by a TDD pico-base-station 230 as aggregated flexible TDD SCell(s). Cross-carrier scheduling may be configured for data transmission/reception on aggregated TDD SCell carrier 280.

If cross-carrier scheduling is enabled, the DL Scheduling module 218 of the PCell FDD base station 210 shall schedule DL data transmission on both FDD PCell carrier 270 and TDD SCell carrier(s) 280 via backhaul 229. The UE is expected to follow the FDD timing and FDD feedback rule for feeding back to the FDD PCell base station HARQ-ACKs in response to data received on FDD PCell DL carrier 270 and TDD SCell DL carrier(s) 280. The DL Scheduling module 218 of PCell FDD base station 210 shall configure DCI processing module 220 to use FDD DCI format(s) to inform the said UE of DL data transmission on FDD PCell DL carrier 270 and TDD SCell DL carrier(s) 280 (i.e. DCI with 3-bits HARQ number field and no DAI field).

Furthermore, if cross-carrier scheduling is enabled, the UL Scheduling module 217 of PCell FDD base station 210 shall schedule UL data transmission from the UE on both FDD PCell and TDD SCell and configure the DCI processing module 220 to transmit UL grants for FDD PCell transmission and TDD SCell transmission using the FDD UL scheduling timing rule. By observing instantaneous traffic in TDD base station 230 (SCell) within a restricted observation time, the advanced mobile network may configure the TDD base station 230 to change to a selected optimum TDD UL-DL configuration as frequently as on a radio frame basis. A base station 210 (PCell) may apply explicit or implicit fast signalling to inform the advanced UE 250 of the change of UL-DL configuration on the TDD SCell. It is preferable that implicit fast signalling be used in the case of cross-carrier scheduling. In this case, upon deciding a flexible subframe on SCell is to operate as a DL subframe, base station 210 will send DL scheduling information on a PCell DL subframe corresponding to a SCell flexible subframe on which DL data is transmitted from SCell base station 230. Furthermore, upon deciding a flexible subframe on SCell is to operate as an UL subframe, base station 210 will send an UL grant on a PCell DL subframe corresponding to a SCell flexible subframe on which a UE 250 is expected to transmit UL data on TDD SCell 280.

If cross-carrier scheduling is enabled and a UE is configured to perform FDD-TDD inter system CA with a FDD PCell and one or more flexible TDD SCell(s), in processing DCI at the DCI processing module 260 a UE 250 will assume that a DCI of the same size (i.e. 3-bits HARQ process number field and no DAI bit field for scheduling DL transmission DCI) received on FDD PCell provides DL scheduling and UL scheduling for both PCell and SCell(s). Upon the reception of DL scheduling for SCell, UE 250 will apply the FDD timing rule for feeding back HARQ-ACKs to the FDD PCell. Upon the reception of UL grant for UL data transmission on TDD SCell UL carrier, UE 250 will apply the FDD timing rule for transmitting PUSCH to the TDD SCell. Since SCell UL-DL configuration may be changed by TDD base station on a radio frame basis, UE 250 will monitor search space on PCell for DL transmission scheduling and UL grant on SCell. On a PCell DL subframe corresponding to a SCell flexible subframe, if UE 250 detects a DL transmission scheduling for SCell, it will perform the processing of PDSCH/DL-SCH on the said SCell flexible subframe. Similarly, on a PCell DL subframe, if UE 250 detects a UL grant for SCell, it will process and transmit PUSCH/UL-SCH on the SCell flexible subframe corresponding to the PCell DL subframe on which an UL grant received.

If cross-carrier scheduling is disabled, the DL Scheduling module 218 of PCell FDD base station 210 shall schedule DL data transmission only on FDD PCell carrier 270 and the DL Scheduling module 238 of SCell TDD base station 230 shall schedule DL data transmission only on TDD SCell carrier 280. The UE is expected to follow the FDD timing and feedback rule for feeding back to the FDD PCell base station HARQ-ACKs in response to data received on FDD PCell DL carrier 270, and to follow the TDD timing and feedback rule for feeding back to the TDD SCell base station(s) HARQ-ACKs in response to data received on TDD SCell DL carrier(s) 280. Upon the reception of HARQ-ACK of SCell on PUCCH, FDD PCell base station 210 shall forward the received SCell HARQ-ACK to the SCell via backhaul 229. The DL Scheduling module 218 of PCell FDD base station 210 shall configure DCI processing module 220 to use FDD DCI format(s) to inform the said UE of DL data transmission on FDD PCell DL carrier 270 and the DL Scheduling module 238 of SCell TDD base station 230 shall configure DCI processing module 240 to use TDD DCI format(s) to inform the said UE of DL data transmission on TDD SCell DL carrier(s) 280 (i.e. TDD DCI with 4-bits HARQ number field and 2-bits DAI field).

Furthermore, if cross-carrier scheduling is disabled, the UL Scheduling module 217 of PCell FDD base station 210 shall schedule UL data transmission from the UE on FDD PCell and configure DCI processing module 220 to transmit UL grants for FDD PCell transmission using the FDD UL scheduling timing rule. The UL Scheduling module 237 of SCell TDD base station 230 shall schedule UL data transmission from UE on TDD SCell and configure DCI processing module 240 to transmit UL grants for TDD SCell transmission using TDD UL scheduling timing rule. By observing instantaneous traffic in the TDD base station 230 (SCell) within a restricted observation time, the advanced mobile network may configure TDD base station 230 to change to a selected optimum TDD UL-DL configuration on as little as a radio frame basis. A base station 210 (PCell) may apply explicit fast signalling as DCI sending on PCell common search space to inform advanced UE 250 of the change of UL-DL configuration on TDD SCell.

If cross-carrier scheduling is disabled and UE 250 is configured to perform FDD-TDD inter system CA with a FDD PCell and one or more flexible TDD SCell(s), in processing DCI received on SCell at DCI processing module 260, UE 250 will assume that a TDD DCI (i.e. 4-bits HARQ process number field and 2-bits DAI field for scheduling DL transmission DCI) received provides DL scheduling and UL scheduling for SCell(s). Upon the reception of DL scheduling for SCell, UE 250 will apply the TDD timing rule for feeding back HARQ-ACKs on PUSCH to the TDD PCell. Upon the reception of UL grant for UL data transmission on TDD SCell UL carrier, UE 250 will apply TDD timing rule for transmitting PUSCH to the TDD SCell. Additionally, UE 250 will monitor PCell common search space for explicit fast signalling indicating the UL-DL configuration change on its flexible TDD SCell.

The following is a summary of some of the important proposals and aspects of the invention discussed above.

When a FDD serving cell is configured as the PCell and a TDD serving cell is configured as the SCell:
- One additional bit for HARQ-process number and a 2-bit DAI in DCI format for TDD operation are dropped in LTE FDD-TDD CA system when the TDD SCell is cross-scheduled by PDCCH/ePDCCH transmitted on the FDD PCell configured as SCell. This results in the same DCI format content for both TDD and FDD, and thus the same number of blind decoding trials as in Rel.10 or 11 CA.
- The HARQ-ACK timing of the FDD PCell is designed as the reference timing for the cross-carrier scheduled TDD SCell.
- The UL grant timing of the FDD serving cell is designed as the reference timing for the cross-carrier scheduled TDD serving cell.
- The transmission direction of flexible subframe is inferred from the PDCCH transmission on the FDD serving cell for cross-carrier scheduling of DL and/or UL transmission on PCell, or indicated by fast TDD configuration signalling.

When a TDD serving cell is configured as the PCell and a FDD serving cell is configured as the SCell:
- One additional bit for HARQ-process number and a 2-bit DAI should be included in UE specific DCI format for the FDD serving cell, regardless of whether PDCCH is transmitted on the FDD serving cell or the TDD serving cell.
- For self-scheduling, a DL subframe on the FDD serving cell with a corresponding UL subframe on the TDD serving cell should be fed back together with the coming DL transmission on DL subframe which corresponds to DL subframe on TDD serving cell.
- HARQ-timing of DL transmission should follow the timing of TDD system. HARQ-timing of UL transmission and UL grant timing for FDD serving cell should follow the timing of FDD system, when cross-carrier scheduling is not configured.
- Otherwise, the timing of TDD system is followed.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The whole or part of the exemplary embodiments disclosed above can be described as, but not limited to, the following supplementary notes.

(Supplementary Note 1)

A signalling method for use in an advanced wireless communication network that supports frequency division duplex—time division duplex (FDD-TDD) carrier aggregation (CA), the system including:

a user equipment (UE) which supports FDD-TDD CA;

a first access node operable to communicate with the UE on a first duplex mode carrier, where the first duplex mode is one of FDD or TDD; and a second access node operable to communicate with the UE on a second duplex mode carrier, where the second duplex mode is the other of FDD or TDD opposite to the first duplex mode;

the method comprising:

configuring the UE, by establishing radio resource control (RRC) connection with the network through the first access node, for data transmission between the UE and the network through the first access node on the first duplex mode carrier as a primary component carrier (PCell), configuring the UE, via dedicated RRC signalling on the PCell, for data transmission between the UE and the network through the second access node on the second duplex mode carrier as a secondary component carrier (SCell), and performing scheduling for data transmission on the aggregated SCell using either self-scheduling or cross-carrier scheduling.

(Supplementary Note 2)

The signalling method as in Supplementary note 1 wherein the first duplex mode is FDD and the second duplex mode is TDD, such that the PCell is FDD and the SCell is TDD.

(Supplementary Note 3)

The signalling method as in Supplementary note 2, wherein cross-carrier scheduling is used for scheduling data transmission on the aggregated SCell.

(Supplementary Note 4)

The signalling method as in Supplementary note 3, wherein the first access node schedules downlink data transmission on both the FDD PCell and the TDD SCell via network backhaul.

(Supplementary Note 5)

The signalling method as in Supplementary note 4, wherein the UE follows a FDD timing and feedback rule for feeding back to the first access node hybrid automatic repeat request acknowledgments (HARQ-ACKs) in response to data received on the FDD PCell downlink carrier and the TDD SCell downlink carrier.

(Supplementary Note 6)

The signalling method as in Supplementary note 4, wherein the first access node uses a FDD downlink control information (DCI) format to inform the UE of downlink data transmissions on the FDD PCell downlink carrier and the TDD SCell downlink carrier.

(Supplementary Note 7)

The signalling method as in Supplementary note 6, wherein the DCI format includes a 3-bit HARQ number field and no downlink assignment index (DAI) field.

(Supplementary Note 8)

The signalling method as in Supplementary note 4, wherein the first access node schedules uplink data transmission from the UE on both the FDD PCell and the TDD SCell and transmits uplink grants for FDD PCell transmission and TDD SCell transmission using a FDD uplink scheduling timing rule.

(Supplementary Note 9)

The signalling method as in Supplementary note 6 wherein, in processing the DCI, the UE assumes that a DCI of the same size received on FDD PCell provides downlink scheduling and uplink scheduling for both the PCell and SCell.

(Supplementary Note 10)

The signalling method as in Supplementary note 9 wherein, upon reception of downlink scheduling for SCell, the UE applies the FDD timing rule for feeding back HARQ-ACKs to the FDD PCell.

(Supplementary Note 11)

The signalling method as in Supplementary note 10 wherein, upon reception of uplink grant for uplink data transmission on the TDD SCell uplink carrier, the UE applies the FDD timing rule for transmitting physical uplink shared channel (PUSCH) to the TDD SCell (Supplementary Note 12)

The signalling method as in Supplementary note 2, wherein self-scheduling is used for scheduling data transmission on the aggregated SCell.

(Supplementary Note 13)

The signalling method as in Supplementary note 12, wherein the first access node schedules downlink data transmission only on the FDD PCell and the second access node schedules downlink data transmission only on the TDD SCell.

(Supplementary Note 14)

The signalling method as in Supplementary note 13, wherein the UE follows a FDD timing and feedback rule for feeding back to the first access node HARQ-ACKs in response to data received on the FDD PCell downlink carrier, and follows a TDD timing and feedback rule for feeding back to the second access node HARQ-ACKs in response to data received on the TDD SCell downlink carrier (Supplementary Note 15)

The signalling method as in Supplementary note 14 wherein, upon reception of HARQ-ACK of SCell on PUCCH, the first access node forwards the received SCell HARQ-ACK to the second access node via backhaul.

(Supplementary Note 16)

The signalling method as in Supplementary note 13, wherein the first access node uses FDD DCI format(s) to inform the UE of downlink data transmission on the FDD PCell downlink carrier, and the second access node uses TDD DCI format(s) to inform the UE of downlink data transmission on the TDD SCell downlink carrier.

(Supplementary Note 17)

The signalling method as in Supplementary note 13, wherein the first access node schedules uplink data transmissions from the UE on the FDD PCell and transmits uplink grants for FDD PCell transmission using a FDD uplink scheduling timing rule.

(Supplementary Note 18)

The signalling method as in Supplementary note 17, wherein the second access node schedules uplink data transmission from the UE on the TDD SCell and transmits uplink grants for TDD SCell transmission using a TDD uplink scheduling timing rule.

(Supplementary Note 19)

The signalling method as in Supplementary note 1 wherein the first duplex mode is TDD and the second duplex mode is FDD, such that the PCell is TDD and the SCell is TDD.

(Supplementary Note 20)

The signalling method as in Supplementary note 19, wherein cross-carrier scheduling is used for scheduling the SCell.

(Supplementary Note 21)

The signalling method as in Supplementary note 20, wherein cross-subframe-cross-carrier scheduling or multiple-subframe-cross-carrier scheduling are adopted.

(Supplementary Note 22)

The signalling method as in Supplementary note 20, wherein the first access node schedules downlink data transmission on both the TDD PCell and the FDD SCell via network backhaul.

(Supplementary Note 23)

The signalling method as in Supplementary note 22, wherein the UE follows a TDD timing and feedback rule for feeding back to the first access node HARQ-ACKs in response to data received on the TDD PCell downlink carrier and on the FDD SCell downlink carrier.

(Supplementary Note 24)

The signalling method as in Supplementary note 23, wherein the first access node uses a TDD DCI format to inform the UE of downlink data transmissions on the TDD PCell downlink carrier and on the FDD SCell downlink carrier.

(Supplementary Note 25)

The signalling method as in Supplementary note 24, wherein the DCI format includes a 4-bit HARQ number field and a 2-bit DAI field.

(Supplementary Note 26)

The signalling method as in Supplementary note 23, wherein the first access node schedules uplink data transmission from the UE on both the TDD PCell and the FDD SCell and transmits uplink grants for TDD PCell transmission and FDD SCell transmission using a TDD uplink scheduling timing rule.

(Supplementary Note 27)

The signalling method as in Supplementary note 24 wherein, in processing the DCI, the UE assumes that a TDD DCI of the same size as received on TDD PCell provides downlink scheduling and uplink scheduling for both the PCell and SCell.

(Supplementary Note 28)

The signalling method as in Supplementary note 27 wherein, upon reception of downlink scheduling and downlink data for SCell, the UE applies the TDD timing rule for feeding back HARQ-ACKs to the TDD PCell.

(Supplementary Note 29)

The signalling method as in Supplementary note 28 wherein, upon reception of uplink grant for uplink data transmission on the FDD SCell uplink carrier, the UE applies the TDD timing rule for transmitting PUSCH to the FDD SCell.

(Supplementary Note 30)

The signalling method as in Supplementary note 19, wherein self-scheduling is used for scheduling the SCell.

(Supplementary Note 31)

The signalling method as in Supplementary note 30, wherein the first access node schedules downlink data transmission only on the TDD PCell and the second access node schedules downlink data transmission only on the FDD SCell.

(Supplementary Note 32)

The signalling method as in Supplementary note 31, wherein the UE follows the TDD timing and feedback rule for feeding back to the first access node HARQ-ACKs in response to data received on the TDD PCell downlink carrier, and follows the PCell's TDD timing and feedback rule for feeding back to the second access node HARQ-ACKs in response to data received on the FDD SCell downlink carrier.

(Supplementary Note 33)

The signalling method as in Supplementary note 32, wherein the UE feeds back HARQ-ACK of data scheduled on downlink subframe(s) on the FDD SCell with corresponding uplink subframe(s) on the TDD PCell, together with incoming downlink transmissions on downlink subframes which correspond to downlink subframes on the TDD PCell.

(Supplementary Note 34)

The signalling method as in Supplementary note 33 wherein, upon reception of HARQ-ACK of the SCell on PUCCH, the first access node forwards the received SCell HARQ-ACKs to the FDD SCell via backhaul.

(Supplementary Note 35)

The signalling method as in Supplementary note 31, wherein the first access node uses a TDD DCI format to inform the UE of downlink data transmission on TDD PCell downlink carrier, and the second access node uses a TDD DCI format(s) to inform the UE of downlink data transmission on FDD SCell downlink carrier.

(Supplementary Note 36)

The signalling method as in Supplementary note 35, wherein the first access node schedules uplink data transmission from the UE on the TDD PCell and transmits uplink grants for TDD PCell transmission using the TDD uplink scheduling timing rule.

(Supplementary Note 37)

The signalling method as in Supplementary note 36, wherein the second access node schedules uplink data transmission from the UE on FDD SCell and transmits uplink grants for FDD SCell transmission using FDD uplink scheduling timing rule and FDD HARQ-ACK rule.

(Supplementary Note 38)

The signalling method as in Supplementary note 37 wherein, in processing DCI received on FDD SCell downlink carrier, the UE assumes that a received TDD DCI provides downlink scheduling and uplink scheduling for SCell.

(Supplementary Note 39)

The signalling method as in Supplementary note 38 wherein, upon reception of downlink scheduling and transmitted data for SCell, the UE applies a TDD timing rule for feeding back HARQ-ACKs to the FDD SCell.

(Supplementary Note 40)

The signalling method as in Supplementary note 39 wherein, upon reception of downlink scheduling and transmitted data for FDD SCell subframe(s) with corresponding uplink subframe(s) on TDD PCell, the UE feeds back HARQ-ACK for data scheduled on those downlink subframes, together with incoming downlink transmissions on downlink subframes which correspond to downlink subframes on TDD PCell.

(Supplementary Note 41)

The signalling method as in Supplementary note 40, wherein upon reception of uplink grant for uplink data transmission on the FDD SCell uplink carrier, the UE applies the FDD timing rule for transmitting PUSCH to the FDD SCell.

(Supplementary Note 42)

The signalling method as in Supplementary note 8, wherein a flexible-TDD carrier is the SCell, and by observing instantaneous traffic in the second access node within a predetermined observation time, the network can configure the second access node to change the TDD uplink-downlink configuration on the TDD SCell.

(Supplementary Note 43)

The signalling method as in Supplementary note 42, wherein implicit fast signalling is used.

(Supplementary Note 44)

The signalling method as in Supplementary note 42 wherein, upon deciding that a flexible subframe on the SCell is to operate as a downlink subframe, the first access node sends downlink scheduling information on a PCell downlink subframe corresponding to a SCell flexible subframe on which downlink data is transmitted from the second access node.

(Supplementary Note 45)

The signalling method as in Supplementary note 44 wherein, upon deciding a flexible subframe on the SCell is to operate as an uplink subframe, the first access node sends an uplink grant on a PCell downlink subframe corresponding to a SCell incoming flexible subframe on which the UE transmits uplink data on TDD SCell.

(Supplementary Note 46)

The signalling method as in Supplementary note 42, wherein the SCell TDD uplink-downlink configuration can be changed by the second access node on a radio frame basis, and the UE monitors search space on PCell for downlink transmission scheduling and uplink grant on SCell.

(Supplementary Note 47)

The signalling method as in Supplementary note 46 wherein, on a PCell downlink subframe corresponding to a SCell flexible subframe, if the UE detects downlink transmission scheduling for SCell, it performs processing of PDSCH/DL-SCH on the said SCell flexible sub frame.

(Supplementary Note 48)

The signalling method as in Supplementary note 47 wherein, on a PCell downlink subframe, if the UE detects an uplink grant for SCell, it processes and transmits PUSCH/UL-SCH on the SCell flexible subframe corresponding to the PCell downlink subframe on which an uplink grant was received.

(Supplementary Note 49)

The signalling method as in Supplementary note 12, wherein a flexible-TDD carrier is the SCell.

(Supplementary Note 50)

The signalling method as in Supplementary note 49, wherein the first access node schedules downlink data transmission only on the FDD PCell and the second access node schedules downlink data transmission only on the TDD SCell.

(Supplementary Note 51)

The signalling method as in Supplementary note 50, wherein the UE follows a FDD timing and feedback rule for feeding back to the first access node HARQ-ACKs in response to data received on the FDD PCell downlink carrier, and the UE follows the TDD timing and feedback rule for feeding back to the second access node HARQ-ACKs in response to data received on the TDD SCell downlink carrier.

(Supplementary Note 52)

The signalling method as in Supplementary note 51 wherein, upon reception of HARQ-ACK of SCell on PUCCH, the first access node forwards the received SCell HARQ-ACK to the SCell via backhaul.

(Supplementary Note 53)

The signalling method as in Supplementary note 50, wherein the first access node uses FDD DCI format(s) to inform the UE of downlink data transmission on the FDD PCell carrier, and the second access node uses TDD DCI format(s) to inform the UE of downlink data transmission on TDD SCell carrier(s).

(Supplementary Note 54)

The signalling method as in Supplementary note 50, wherein the first access node schedules uplink data transmissions from the UE on the FDD PCell and transmits uplink grants for FDD PCell transmission using the FDD uplink scheduling timing rule.

(Supplementary Note 55)

The signalling method as in Supplementary note 54, wherein the second access node schedules uplink data transmissions from the UE on the TDD SCell and transmits uplink grants for TDD SCell transmission using the TDD uplink scheduling timing rule.

(Supplementary Note 56)

The signalling method as in Supplementary note 55 wherein, by observing instantaneous traffic in the second access node within a predetermined observation time, the network can configure the second access node to change the TDD uplink-downlink configuration on the TDD SCell.

(Supplementary Note 57)

The signalling method as in Supplementary note 56 wherein the first access node applies explicit fast signalling on PCell common search space (CSS) to inform the UE of change of UL-DL configuration on TDD SCell.

(Supplementary Note 58)

The signalling method as in Supplementary note 57, wherein UE monitors PCell CSS to detect UL-DL configuration updates on SCell.

This application is based upon and claims the benefit of priority from Australia Patent Application No. 2013903561, filed on Sep. 16, 2013, the disclosure of which is incorporated herein in its entirety by reference.

REFERENCE SIGNS LIST

100 ADVANCED WIRELESS COMMUNICATION SYSTEM
101 BASE STATION
102 PICO-BASE STATION
103 PICO-BASE STATION
104 UE
105 UE
106 UE
110 BASE STATION
111 SECOND DEPLOYMENT SCENARIO
112 THIRD DEPLOYMENT SCENARIO
120 MOBILITY
121 MOBILITY
122 MOBILITY
123 MOBILITY
210 BASE STATION
211 PROCESSOR
212 MEMORY
213 FDD RADIO FREQUENCY (RF) MODULE
214 ANTENNA ARRAY
215 TRANSMIT (TX) MODULE
216 RECEIVE (RX) MODULE
217 UL SCHEDULING MODULE
218 DL SCHEDULING MODULE
220 DCI PROCESSING MODULE
221 PDCCH/E-PDCCH PROCESSING MODULE
222 PDSCH/DL-SCH PROCESSING MODULE
223 PUCCH PROCESSING MODULE
224 PUSCH PROCESSING MODULE
229 TDD SERVING CELL VIA BACKHAUL
230 BASE STATION
231 PROCESSOR
232 MEMORY
233 RADIO FREQUENCY (RF) MODULE
234 ANTENNA ARRAY
235 TX MODULE
236 RX MODULE
237 UL SCHEDULING MODULE
238 DL SCHEDULING MODULE
239 TDD RECONFIGURATION MODULE
240 DCI PROCESSING MODULE
242 PDSCH/DL-SCH PROCESSING MODULE
243 PUCCH PROCESSING MODULE
244 PUSCH PROCESSING MODULE
250 UE
251 PROCESSOR
252 MEMORY
253 FDD RADIO FREQUENCY (RF) MODULE
254 ANTENNAS
255 TDD RADIO FREQUENCY (RF) MODULE
256 ANTENNAS
257 RX MODULE
258 TX MODULE
260 DCI PROCESSING MODULE
261 PDCCH/E-PDCCH PROCESSING MODULE
262 PDSCH/DL-SCH PROCESSING MODULE

263 PUCCH PROCESSING MODULE
264 PUSCH PROCESSING MODULE
270 FDD SCell DL CARRIER
301 Case A
302 Case B
311a DL SCHEDULING ASSIGNMENT
312a ASSOCIATED PDSCH TRANSMISSION
313a REPRESENTED FOR PCELL
314a REPRESENTED FOR PCELL
315a DL SCHEDULING ASSIGNMENT
316a ASSOCIATING PDSCH TRANSMISSION
317a REPRESENTED FOR SCELL
318a REPRESENTED FOR SCELL
311b PDCCH
312b PDSCH
315b PDCCH
316b PDSCH
401 PCELL FDD DL
402 PCELL FDD UL
403 SCELL TDD, CONFIG #5
404 DL SUBFRAME #9
405 DL SUBFRAME #7
406 UL SUBFRAME #3
407 UL SUBFRAME #1
408 UE on SUBFRAME #9
409 UE on SUBFRAME #0
410 UE on SUBFRAME #1
411 UE on SUBFRAME #3
412 UE on SUBFRAME #4
413 UE on SUBFRAME #5
414 UE on SUBFRAME #6
415 UE on SUBFRAME #7
416 UE on SUBFRAME #8
417 UL SUBFRAME #2
418 DL SUBFRAME #6
419 UL SUBFRAME #2
420 FDD PCELL UL SUBFRAME #8
422 FDD PCELL UL SUBFRAME #7
501 FDD SCELL DL
502 FDD SCELL UL
503 TDD PCELL UL
504 UL SUBFRAME #4
505 UL SUBFRAME #5
506 UL SUBFRAME #7
507 UL SUBFRAME #8
508 DL SUBFRAME #0
509 DL SUBFRAME #1
510 DL SUBFRAME #2
511 DL SUBFRAME #3
512 DL SUBFRAME #4
513 DL SUBFRAME #0
514 DL SUBFRAME #1
515 DL SUBFRAME #4
516 UL SUBFRAME #7
517 UL SUBFRAME #8
518 UL SUBFRAME #2
519 UL SUBFRAME #3
601 FDD SCELL DL
602 FDD SCELL UL
603 TDD PCELL UL
604 DL SUBFRAME #9
605 DL SUBFRAME #0
606 DL SUBFRAME #1
607 DL SUBFRAME #2
608 DL SUBFRAME #3
609 DL SUBFRAME #4
610 DL SUBFRAME #5
611 DL SUBFRAME #6
612 DL SUBFRAME #7
613 DL SUBFRAME #8
614 UL SUBFRAME #3
615 UL SUBFRAME #1
616 UL SUBFRAME #2
617 DL SUBFRAME #9
618 DL SUBFRAME #0
619 DL SUBFRAME #1
620 DL SUBFRAME #3
621 DL SUBFRAME #4
622 DL SUBFRAME #5
623 DL SUBFRAME #6
624 DL SUBFRAME #7
625 DL SUBFRAME #8
626 UL SUBFRAME #2
627 DL SUBFRAME #6

The invention claimed is:

1. In a wireless communications system including a user equipment (UE) supporting frequency division duplex (FDD)-time division duplex (TDD) carrier aggregation (CA), a first access node operable to communicate with the UE on a first duplex mode carrier, and a second access node operable to communicate with the UE on a second duplex mode carrier, a method implemented in the first access node, the method comprising:
transmitting, to the UE, first radio resource control (RRC) signalling for data transmission through the first access node on the first duplex mode carrier as a primary component carrier (PCell);
transmitting, to the UE after transmitting the first RRC signalling, second RRC signalling on the PCell for data transmission through the second access node on the second duplex mode carrier as a secondary component carrier (SCell);
scheduling downlink data transmission on the PCell and the SCell via network backhaul; and
informing the UE of downlink data transmission on the PCell and the SCell using a first duplex mode downlink control information (DCI) format,
wherein, in processing the first duplex mode DCI format, the UE assumes that a DCI format of the same size received on the PCell provides downlink scheduling and uplink scheduling for the PCell and SCell.

2. The method as in claim 1, wherein the second RRC signalling comprises dedicated RRC signalling.

3. The method as in claim 1, wherein the first duplex mode is FDD and the second duplex mode is TDD.

4. The method as in claim 3, wherein the first duplex mode is FDD and the second duplex mode is flexible TDD.

5. The method as in claim 1, wherein the first duplex mode is TDD and the second duplex mode is FDD.

6. The method as in claim 1, further comprising:
performing scheduling for data transmission on the SCell using cross-carrier scheduling.

7. The method as in claim 1, further comprising:
performing scheduling for data transmission on an aggregated SCell using self-scheduling.

8. The method as in claim 7, further comprising:
scheduling downlink data transmission only on the PCell, wherein the second access node schedules downlink data transmission only on the SCell.

9. The method as in claim 8, wherein the UE follows a first duplex mode timing and feedback rule for feeding back to the first access node a hybrid automatic repeat request acknowledgment (HARQ-ACK) in response to data received on the PCell, and follows a TDD timing and feedback rule for feeding back to the second access node a HARQ-ACK in response to data received on the SCell.

10. The method as in claim 9, further comprising:
upon reception of the HARQ-ACK of the SCell on PUCCH, forwarding the received SCell HARQ-ACK to the second access node via backhaul.

11. The method as in claim 8, further comprising:
informing the UE of downlink data transmission on the PCell using a first duplex mode downlink control information (DCI) format,
wherein the second access node informs the UE of downlink data transmission on the SCell using a second duplex mode DCI format.

12. The method as in claim 8, further comprising:
scheduling uplink data transmission from the UE on the PCell; and
transmitting uplink grant for PCell transmission using a first duplex mode uplink scheduling timing rule.

13. The method as in claim 12, wherein the second access node schedules uplink data transmission from the UE on the SCell, and transmits uplink grant for SCell transmission using a second duplex mode uplink scheduling timing rule.

14. The method as in claim 1, wherein the UE follows a first duplex mode timing and feedback rule for feeding back to the first access node a hybrid automatic repeat request acknowledgment (HARQ-ACK) in response to data received on the PCell and the SCell.

15. The method as in claim 1, further comprising:
scheduling uplink data transmission from the UE on the PCell and the SCell; and
transmitting uplink grant for PCell transmission and SCell transmission using a first duplex mode uplink scheduling timing rule.

16. The method as in claim 1, wherein, upon reception of downlink scheduling for the SCell, the UE applies a first duplex mode timing rule for feeding back a HARQ-ACK to the PCell.

17. The method as in claim 16, wherein, upon reception of uplink grant for uplink data transmission on the SCell carrier, the UE applies the first duplex mode timing rule for transmitting a physical uplink shared channel (PUSCH) to the SCell.

18. In a wireless communications system including a user equipment (UE) supporting frequency division duplex (FDD)-time division duplex (TDD) carrier aggregation (CA), a first access node operable to communicate with the UE on a first duplex mode carrier, and a second access node operable to communicate with the UE on a second duplex mode carrier, a method implemented in the UE, the method comprising:

receiving, from the first access node, first radio resource control (RRC) signalling for data transmission through the first access node on the first duplex mode carrier as a primary component carrier (PCell);
receiving, from the first access node after receiving the first RRC signalling, second RRC signalling on the PCell for data transmission through the second access node on the second duplex mode carrier as a secondary component carrier (SCell);
receiving, from the first access node, information of downlink data transmission on the PCell and the SCell using a first duplex mode downlink control information (DCI) format, after being scheduled, by the first access node, downlink data transmission on the PCell and the SCell via network backhaul; and
assuming, in processing the first duplex mode DCI format, that a DCI format of the same size received on the PCell provides downlink scheduling and uplink scheduling for the PCell and SCell.

19. A method implemented in a wireless communications system including a user equipment (UE) supporting frequency division duplex (FDD)-time division duplex (TDD) carrier aggregation (CA), a first access node operable to communicate with the UE on a first duplex mode carrier, and a second access node operable to communicate with the UE on a second duplex mode carrier, the method comprising:

transmitting, from the first access node to the UE, first radio resource control (RRC) signalling for data transmission through the first access node on the first duplex mode carrier as a primary component carrier (PCell); and
transmitting, from the first access node to the UE after transmitting the first RRC signalling, second RRC signalling on the PCell for data transmission through the second access node on the second duplex mode carrier as a secondary component carrier (SCell);
scheduling, by the first access node, downlink data transmission on the PCell and the SCell via network backhaul;
informing, by the first access node, the UE of downlink data transmission on the PCell and the SCell using a first duplex mode downlink control information (DCI) format; and
assuming, by the UE in processing the first duplex mode DCI format, that a DCI format of the same size received on the PCell provides downlink scheduling and uplink scheduling for the PCell and SCell.

* * * * *